(12) United States Patent
Yoda et al.

(10) Patent No.: US 8,577,954 B2
(45) Date of Patent: Nov. 5, 2013

(54) POSTING SERVER, CONTENT TRANSMISSION SYSTEM, AND POSTING SERVER CONTROL METHOD

(75) Inventors: Kiyoshi Yoda, Matsuroto (JP); Katsunori Nagao, Mutsunoto (JP); Masanobu Nishitani, Suwa (JP); Eiji Kubota, Shioriti (JP); Takao Ozawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 440 days.

(21) Appl. No.: 12/221,036

(22) Filed: Jul. 30, 2008

(65) Prior Publication Data

US 2009/0037513 A1     Feb. 5, 2009

(30) Foreign Application Priority Data

Jul. 31, 2007  (JP) .................. 2007-198773
Sep. 18, 2007  (JP) .................. 2007-241424

(51) Int. Cl.
*G06F 15/16*     (2006.01)

(52) U.S. Cl.
USPC ........................................... 709/201

(58) Field of Classification Search
USPC ........................... 709/201, 203, 224
See application file for complete search history.

(56) References Cited

U.S. PATENT DOCUMENTS

| | | | |
|---|---|---|---|
| 6,452,692 B1 * | 9/2002 | Yacoub ............... | 358/1.15 |
| 6,891,799 B1 | 5/2005 | Hagai et al. | |
| 7,024,178 B2 | 4/2006 | Uchimura | |
| 7,239,410 B2 * | 7/2007 | Matsueda ............ | 358/1.15 |
| 7,258,498 B2 * | 8/2007 | Hatta et al. ......... | 400/62 |
| 7,437,750 B1 | 10/2008 | Sonoda et al. | |
| 7,978,832 B2 | 7/2011 | Izumi | |
| 2002/0033964 A1 | 3/2002 | Suzuki et al. | |
| 2002/0046101 A1 | 4/2002 | Ogawa et al. | |
| 2003/0016385 A1 | 1/2003 | Matsumoto et al. | |
| 2003/0030843 A1 | 2/2003 | Qiao | |
| 2003/0171988 A1 | 9/2003 | Sugihara | |
| 2004/0012812 A1 | 1/2004 | Shimizu | |
| 2004/0078340 A1 | 4/2004 | Evans | |
| 2004/0179230 A1 | 9/2004 | Kitada et al. | |
| 2004/0252322 A1 | 12/2004 | Gassho et al. | |

(Continued)

FOREIGN PATENT DOCUMENTS

| | | |
|---|---|---|
| CN | 1453697 A | 11/2003 |
| CN | 1515991 A | 7/2004 |

(Continued)

OTHER PUBLICATIONS

European Search Report (Nov. 26, 2008) issued in the related U.S. Appl. No. 12/221,037.

(Continued)

*Primary Examiner* — Jason Recek
(74) *Attorney, Agent, or Firm* — Nutter McClennen & Fish LLP; John J. Penny, Jr.; Christina M. Sperry

(57) ABSTRACT

A printing terminal 208P creates delivery result information regarding delivered content data and transmits the created delivery result information to a posting server 202. The posting server 202 receives the transmitted delivery result information, adds the received delivery result information to delivery record information stored in a memory, and notifies a sending terminal of at least part of the delivery record information. This arrangement enables low-cost and high-quality delivery of print contents.

20 Claims, 24 Drawing Sheets

(56) References Cited

U.S. PATENT DOCUMENTS

| | | |
|---|---|---|
| 2005/0018242 A1 | 1/2005 | Azami |
| 2005/0273595 A1 | 12/2005 | Ogawa et al. |
| 2006/0007484 A1 | 1/2006 | Tanimoto |
| 2006/0146363 A1 | 7/2006 | Choi et al. |
| 2006/0227376 A1 | 10/2006 | Kinoshita |
| 2007/0019572 A1 | 1/2007 | Yoshida et al. |
| 2007/0162744 A1 | 7/2007 | Hoshino et al. |
| 2008/0117451 A1 | 5/2008 | Wang |
| 2009/0201535 A1 | 8/2009 | Nagao et al. |
| 2009/0201536 A1 | 8/2009 | Yoda et al. |
| 2009/0204686 A1 | 8/2009 | Yoda et al. |

FOREIGN PATENT DOCUMENTS

| | | |
|---|---|---|
| CN | 1719861 A | 1/2006 |
| CN | 1801882 A | 7/2006 |
| EP | 0 881 816 A2 | 12/1998 |
| EP | 1211593 A2 | 6/2002 |
| JP | 10-327288 A | 12/1998 |
| JP | 2000-358231 A | 12/2000 |
| JP | 2001-067191 A | 3/2001 |
| JP | 2001-184179 A | 7/2001 |
| JP | 2002-23987 | 1/2002 |
| JP | 2002-027369 A | 1/2002 |
| JP | 2002-032207 A | 1/2002 |
| JP | 2002-175233 A | 6/2002 |
| JP | 2002-244835 | 8/2002 |
| JP | 2003-018394 A | 1/2003 |
| JP | 2003-030534 A | 1/2003 |
| JP | 2003008569 A | 1/2003 |
| JP | 2003-084949 A | 3/2003 |
| JP | 2003-087408 A | 3/2003 |
| JP | 2003-178028 | 6/2003 |
| JP | 2003-263585 A | 9/2003 |
| JP | 2004-220140 A | 8/2004 |
| JP | 2005-079929 A | 3/2005 |
| JP | 2005-109701 | 4/2005 |
| JP | 2005-128968 A | 5/2005 |
| JP | 2005-516320 | 6/2005 |
| JP | 2005-242873 A | 9/2005 |
| JP | 2006-085577 A | 3/2006 |
| JP | 2006-202218 A | 8/2006 |
| JP | 2006-221456 A | 8/2006 |
| JP | 2006-256125 A | 9/2006 |
| JP | 2006-279967 A | 10/2006 |
| JP | 2007-067706 A | 3/2007 |
| KR | 200670339 A | 2/2007 |
| KR | 20076560 B1 | 7/2008 |

OTHER PUBLICATIONS

Office Action dated Sep. 8, 2011 for U.S. Appl. No. 12/221,038.
Office Action dated Jun. 1, 2012 in regards to U.S. Appl. No. 12/221,038.
Rosenberg et al., SIP: Session Initiated Protocol. Request for Comments 3261. [Online] IETF. Jun. 10-18, 2002. Retrieved on Sep. 18, 2012. URL: http://www.rfc-editor.org/rfc/pdfrfc/rfc3261.txt.pdf.
Office Action dated Mar. 30, 2012 in regards to U.S. Appl. No. 12/221,037.
Office Action dated Apr. 30, 2012 in regards to U.S. Appl. No. 12/221,047.
Office Action dated Nov. 1, 2011 in regards to U.S. Appl. No. 12/221,037.
Office Action dated Jan. 27, 2012 in regards to U.S. Appl. No. 12/221,038.

* cited by examiner

POSTING SERVER, CONTENT TRANSMISSION SYSTEM, AND POSTING SERVER CONTROL METHOD

BACKGROUND OF THE INVENTION

1. Field of the Invention

The present invention relates to a technique of transmitting content data for printing a content via a network. In the specification hereof, the terminology of 'print content' or 'content' means any of various pieces of information including documents, images, and their combinations and especially refers to printable information. The 'content data' means data representing such a content.

2. Description of the Related Art

A company generally delivers advertisements to its customers by mail or by facsimile. The mail and the facsimile are also used for delivery of materials for distance learning from a correspondence organization to its students.

The mail delivery system provides the respective customers or students with high-quality prints of advertisements or materials as print contents. The mail delivery system, however, requires the large manpower for the mail delivery, thus undesirably increasing the cost and taking rather long time for the delivery.

The facsimile delivery system, on the other hand, does not require the large manpower or the long time, compared with the mail delivery system. The facsimile delivery system, however, still needs the communication cost and does not provide the customers or students with the high-quality print contents.

The advancement of the Internet enables very low-cost transmission of information. The development of high-performance printers and complex machines enables relatively low-cost and high-quality printing in homes.

Known techniques for transmission of information via a network are disclosed in, for example, Japanese Patent Laid-Open No. 2005-109701 and No. 2003-178028 and Patent Application Publication No. 2005-516320.

In the above circumstances, it is required to develop a system of utilizing a network, such as the Internet and printing terminals including printers and complex machines to enable low-cost and high-quality delivery of print contents.

SUMMARY OF THE INVENTION

There would thus be a demand for low-cost and high-quality delivery of print contents.

The present invention accomplishes at least part of the demand mentioned above and other relevant demands by the following configurations applied to the posting server, the content transmission system, and the posting server control method.

According to one aspect, the present invention is directed to a posting server connected to a network. The posting server includes: a receiver module configured to receive content data for printing a content from a sending terminal; a delivery module configured to deliver the content data to a printing terminal via the network; a storage unit configured to store delivery record information regarding the delivered content data; and a notification module. In response to transmission of delivery result information regarding the delivered content data from the printing terminal, the receiver module receives the transmitted delivery result information and adds the received delivery result information to the delivery record information stored in the storage unit, and the notification module notifies the sending terminal of at least part of the delivery record information.

The printing terminal creates the delivery result information regarding the delivered content data and transmits the created delivery result information to the posting server. The posting server according to one aspect of the invention receives the transmitted delivery result information, adds the received delivery result information to the delivery record information stored in the storage unit, and notifies the sending terminal of at least part of the delivery record information. This arrangement enables the sending terminal to refer to the notified information and check whether the delivered print content is actually printed, thus enhancing the reliability of delivery of the content data.

In one preferable embodiment of the posting server according to the above aspect of the invention, the receiver module creates delivery result information regarding the delivered content data separately from the delivery result information transmitted from the printing terminal and adds the created delivery result information to the delivery record information stored in the storage unit.

The delivery result information may be created by the posting server, as well as being created by the printing terminal and sent to the posting server.

In the posting server according to the above aspect of the invention, it is preferable that the delivery result information includes at least one of a status of the content data, a time when the content data is in the status, and a storage location of the content data.

This configuration of the delivery result information enables the sending terminal to grasp the status of the delivered content data while tracing the delivery of the content data.

In one preferable application of the invention, in response to a change in status of the content data, the posting server creates delivery result information regarding the change in status of the content data, adds the created delivery result information to the delivery record information stored in the storage unit, and notifies the sending terminal of at least part of the delivery record information.

In the case of a change in status of the content data, the posting server of this application immediately notifies the sending terminal of the information regarding the change in status of the content data. This arrangement enables the sending terminal to be notified of the status of the content data in real time.

In another preferable application of the invention, the posting server receives delivery destination information with the content data from the sending terminal and delivers the content data based on the received delivery destination information.

The posting server of this application delivers the content data according to the delivery destination information. This arrangement enables delivery of content data to any specified delivery destination.

Another aspect of the invention provides a content transmission system configured to transmit content data for printing a content via a network. The content transmission system includes: a sending terminal configured to send the content data; a posting server connected to the network, constructed to have a storage unit, and configured to receive the content data from the sending terminal, to deliver the received content data via the network, and to store delivery record information regarding the delivered content data into the storage unit; and a printing terminal connected to the network and configured to receive the content data delivered by the posting server and perform a printing operation according to the received content data. The printing terminal creates delivery result information regarding the delivered content data and transmits the created delivery result information to the posting server. The posting server receives the transmitted delivery result information, adds the received delivery result information to the delivery record information storage in the storage unit, and notifies the sending terminal of at least part of the delivery record information.

In the content transmission system according to this aspect of the invention, the printing terminal creates the delivery result information regarding the delivered content data and transmits the created delivery result information to the posting server. The posting server receives the transmitted delivery result information, adds the received delivery result information to the delivery record information stored in the storage unit, and notifies the sending terminal of at least part of the delivery record information. This arrangement enables the sending terminal to refer to the notified information and check whether the delivered print content is actually printed, thus enhancing the reliability of delivery of the content data.

Still another aspect of the invention provides a posting server control method of controlling a posting server connected to a network and constructed to have a storage unit. The posting server control method receives content data for printing a content from a sending terminal, delivers the received content data to a printing terminal via the network, and stores delivery record information regarding the delivered content data into the storage unit. The posting server control method also receives delivery result information regarding the delivered content data from the printing terminal, if any, adds the received delivery result information to the delivery record information stored in the storage unit, and notifies the sending terminal of at least part of the delivery record information.

The arrangement of the posting server control method has the same effects and advantages as those of the posting server explained above.

In one preferable application of the invention, the posting server control method also creates delivery result information regarding the delivered content data separately from the delivery result information received from the printing terminal and adds the created delivery result information to the delivery record information stored in the storage unit.

As mentioned above, the delivery result information may be created by the posting server, as well as being created by the printing terminal and sent to the posting server.

In the posting server control method according to the above aspect of the invention, it is preferable that the delivery result information includes at least one of a status of the content data, a time when the content data is in the status, and a storage location of the content data.

This configuration of the delivery result information enables the sending terminal to grasp the status of the delivered content data while tracing the delivery of the content data.

In another preferable application of the invention, in response to a change in status of the content data, the posting server control method also creates delivery result information regarding the change in status of the content data, adds the created delivery result information to the delivery record information stored in the storage unit, and notifies the sending terminal of at least part of the delivery record information.

In the case of a change in status of the content data, the posting server control method immediately notifies the sending terminal of the information regarding the change in status of the content data. This arrangement enables the sending terminal to be notified of the status of the content data in real time.

In still another preferable application of the invention, the posting server control method receives delivery destination information with the content data from the sending terminal and delivers the content data according to the received delivery destination information.

The posting server control method of this application delivers the content data according to the delivery destination information. This arrangement enables delivery of content data to any specified delivery destination.

The present invention is not restricted to the posting server, the content transmission system, or the posting server control method described above. The present invention may be actualized by diversity of other applications, for example, computer programs configured to actualize the posting server, the content transmission system, and the posting server control method and recording media in which such computer programs are recorded.

DESCRIPTION OF THE PREFERRED EMBODIMENTS

Some modes of carrying out the invention are described below as preferred embodiments in the following sequence with reference to the accompanied drawings:
- A. First Embodiment
- B. Second Embodiment
- C. Third Embodiment
- D. Modifications 1
- E. Fourth Embodiment
- F. Fifth Embodiment
- G. Sixth Embodiment
- H. Seventh Embodiment
- I. Modifications 2

A. First Embodiment

A-1. System Configuration

Figure 1:
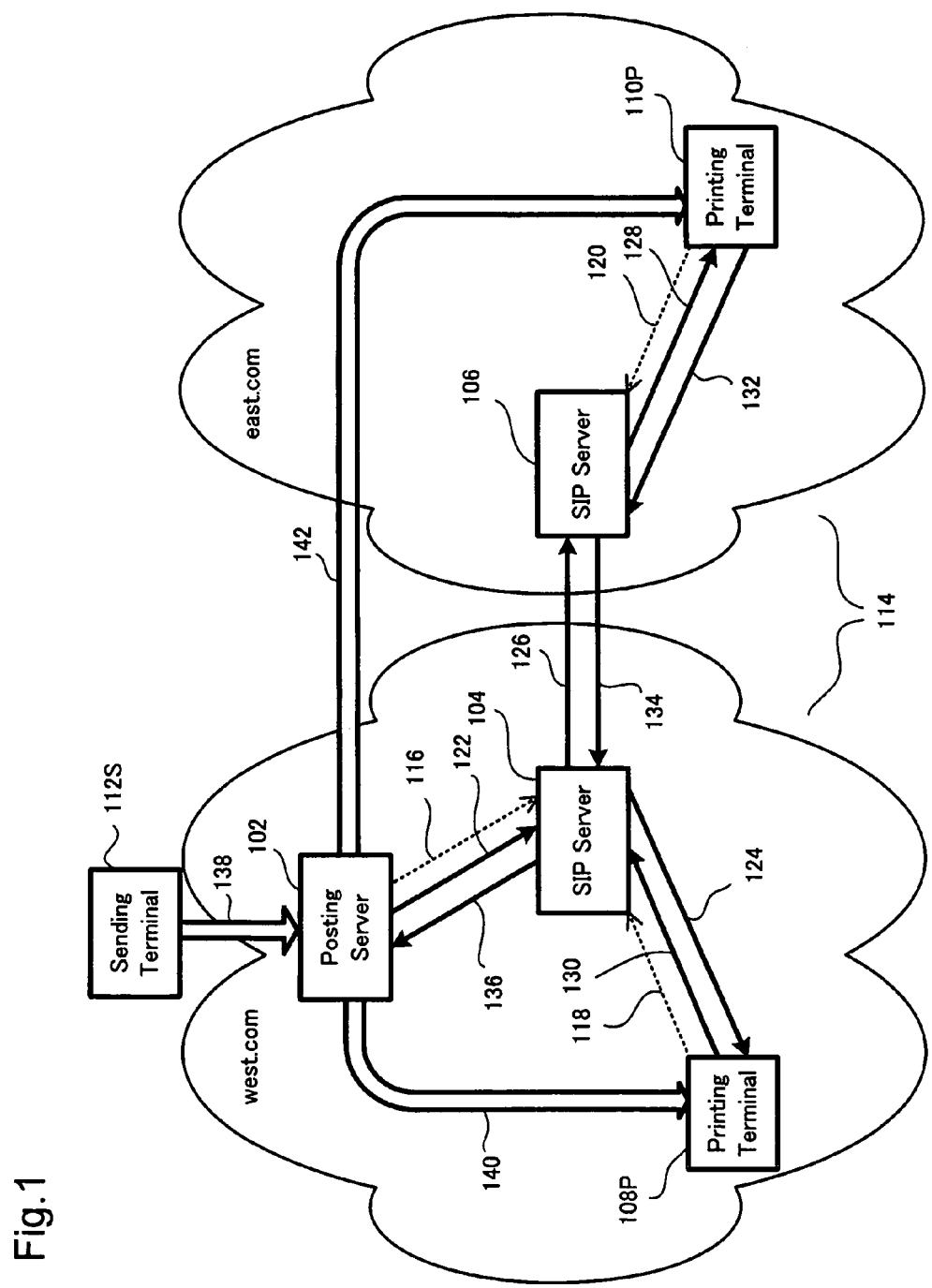
FIG. 1 is a block diagram schematically illustrating the configuration of a content transmission system in a first embodiment of the invention.

FIG. 1 is a block diagram schematically illustrating the configuration of a content transmission system in a first embodiment of the invention.

As shown in FIG. 1, the content transmission system of the first embodiment includes a sending terminal 112S managed by a company desiring delivery of print contents (for example, advertisements or materials for distance learning), a posting server 102 and SIP (Session Initiation Protocol) servers 104 and 106 managed by at least one network service provider, and printing terminals 108P and 110P managed by individual customers. The posing server 102 and the SIP servers 104 and 106 may be managed by different network service providers or may be managed by one identical network service provider. The posting server 102, the SIP servers 104 and 106, and the printing terminals 108P and 110P are interconnected via a broadband network 114, such as the Internet. The sending terminal 112S may be connected with the posting server 102 via a broadband network or may otherwise be connected with the posting server 102 via a leased line.

In the network 114 shown in FIG. 1, the posting server 102, the SIP server 104, and the printing terminal 108P belong to a west.com domain, while the SIP server 106 and the printing terminal 110P belong to an east.com domain.

In the content transmission system of this embodiment, each print content, such as an advertisement or a material for distance learning, is sent as content data from the sending terminal 112S to the posting server 102 and is delivered in a 'push' type by the posting server 102 to the respective printing terminals 108P and 110P. The content data used for printing the content may be any of diverse data representing images and documents, for example, JPEG data, GIF data, PNG data, TIFF data, plain text data, HTML data, PDF data, and PostScript (registered trademark) data. For a known model of a printer adopted in each printing terminal, the content data may be delivered in the form of print data. In the 'push type' delivery, a server unilaterally sends information to respective terminals without information requests from the terminals.

Figure 2:
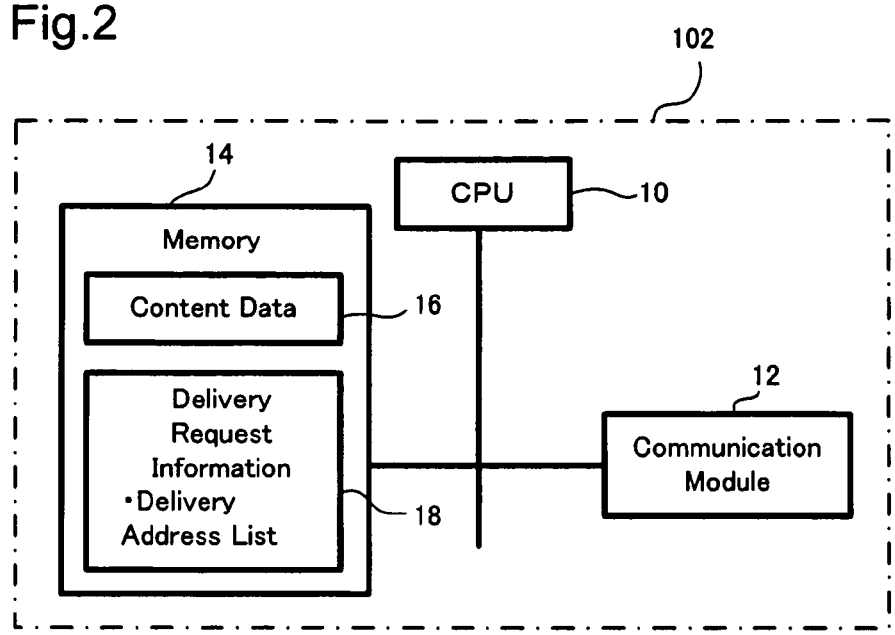
FIG. 2 is a block diagram showing the primary structure of a posting server included in the content transmission system of FIG. 1.

FIG. 2 is a block diagram showing the primary structure of the posting server 102 included in the content transmission system of FIG. 1. As shown in FIG. 2, the posting server 102 is constructed by a server computer and mainly includes a CPU 10 configured to perform diversity of processing operations and controls according to programs, a communication module 12 configured to transmit various data and information to and from other devices via a network, and a memory 14 configured to store programs as well as data and information therein. The memory 14 is capable of storing content data 16 and delivery request information 18 as part of the storable data and information as explained later. The posting server 102 also has an input unit, such as a keyboard and a pointing device, and a display unit, such as a monitor, in addition to the above primary components, although these additional components are omitted from the illustration.

In the content transmission system of this embodiment, prior to delivery of the content data, a session is established between devices by an SIP (Session Initiation Protocol) as one type of signaling protocol. HTTP (Hypertext Transfer Protocol) as one type of data transfer protocol is used for actual delivery of the content data or for transmission of the content data between the devices. The 'session' is established to allow transmission of media streams between terminals and other nodes.

Figure 3:
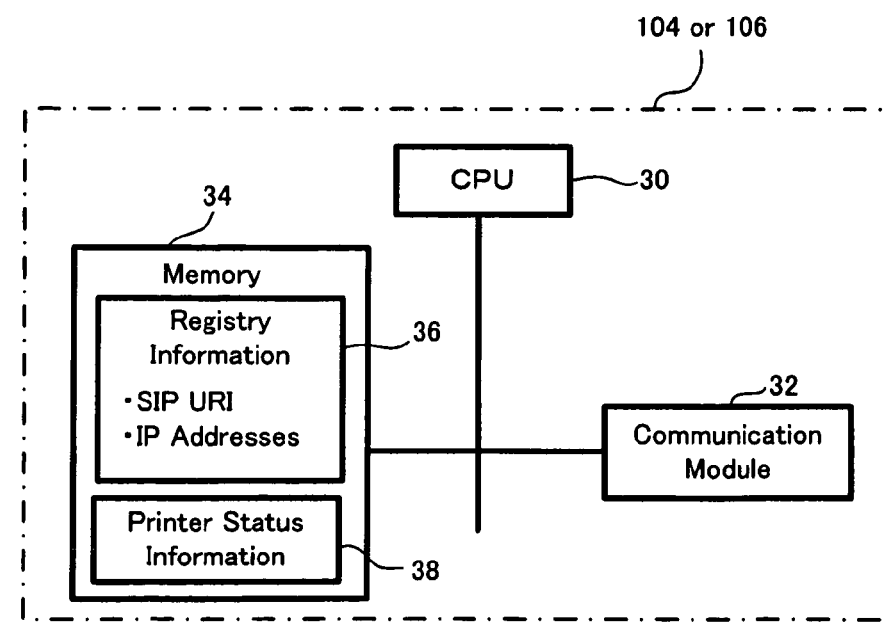
FIG. 3 is a block diagram showing the primary structure of SIP servers included in the content transmission system of FIG. 1.

FIG. 3 is a block diagram showing the primary structure of the SIP servers 104 and 106 included in the content transmission system of FIG. 1. As shown in FIG. 3, like the posting server 102, each of the SIP servers 104 and 106 is constructed by a server computer and mainly includes a CPU 30 configured to perform diversity of processing operations and controls according to programs, a communication module 32 configured to transmit various data and information to and from other devices via a network, and a memory 34 configured to store programs as well as data and information therein. The memory 34 is capable of storing registry information 36 and printer status information 38 as part of the storable information as explained later. The SIP server 104 or 106 also has an input unit, such as a keyboard and a pointing device, and a display unit, such as a monitor, in addition to the above primary components, although these additional components are omitted from the illustration.

Figure 4:
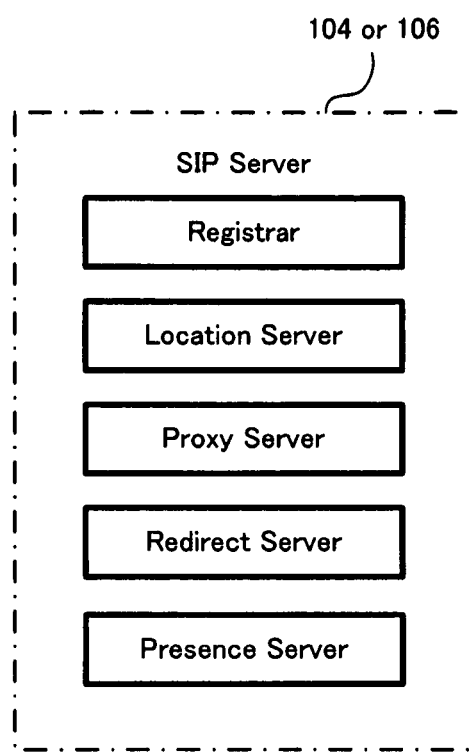
FIG. 4 shows general classification of the SIP server.

FIG. 4 shows general classification of the SIP server. The SIP server is generally classified into multiple types of FIG. 4 according to its functions.

A registrar receives a registration request from each SIP client (SIP user agent) and registers an IP address (SIP URI (Uniform Resource Identifier)) and location information (for example, IP (Internet Protocol) address) of the SIP client into a location server.

The location server is a database for storing SIP addresses and location information of SIP clients and servers.

A proxy server relays requests and responses between SIP clients and mediates sessions between the SIP clients.

A redirect server notifies an SIP client of location information of a desired transmission destination in response to an inquiry from the SIP client.

A presence server obtains and manages information regarding a status of each SIP client (for example, a power-on state or a power-off state) and provides another SIP client with the obtained and managed information.

Figure 5:
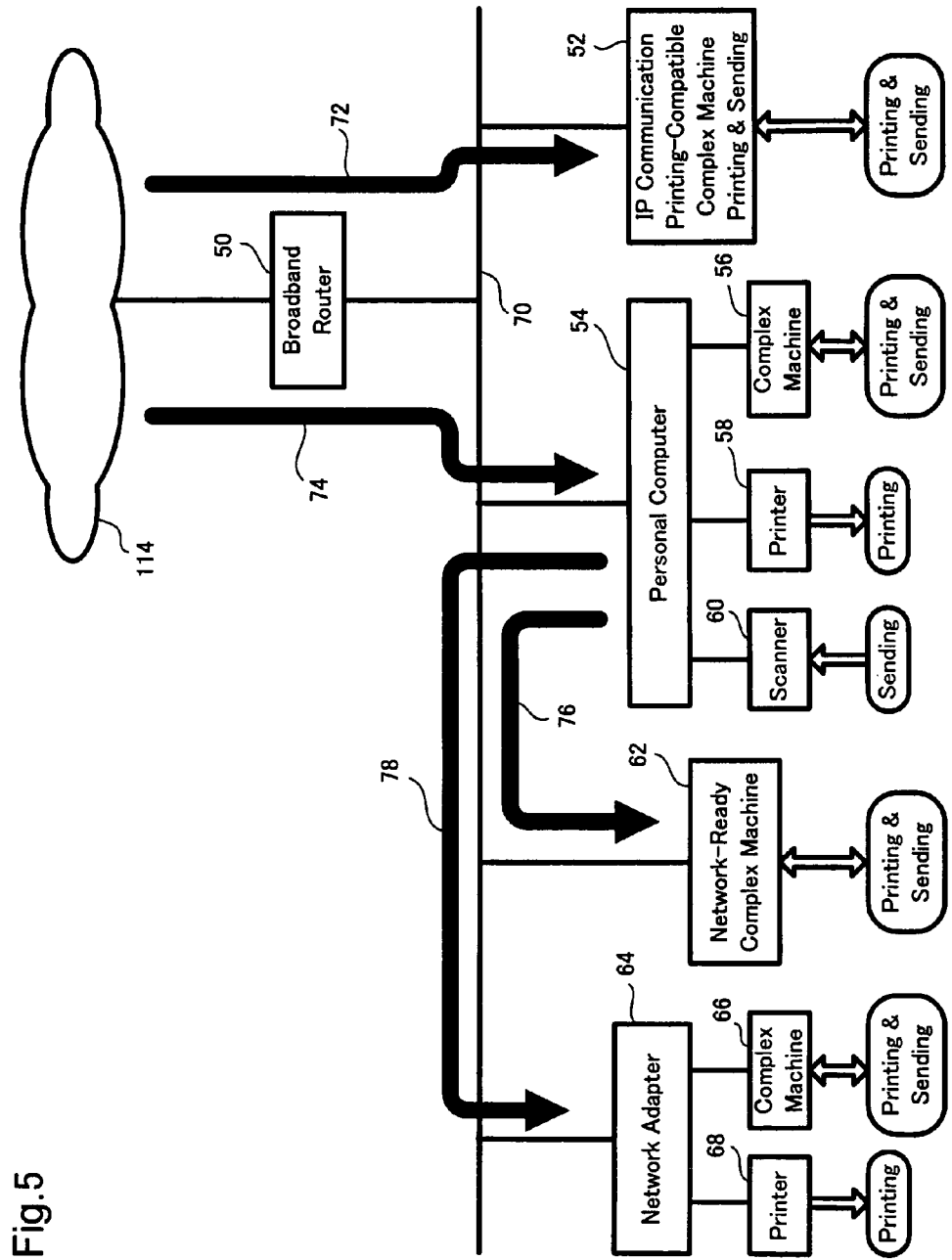
FIG. 5 shows various constructions of printing terminals in the content transmission system of FIG. 1.

FIG. 5 shows various configurations of the printing terminals 108P and 110P in the content transmission system of FIG. 1. Each of the printing terminals 108P and 110P may have any of various arrangements shown in FIG. 5. In the description below, a complex machine represents a multi-function printing device having at least printing functions and scanning and sending functions. A printer represents a single-function printing device having at least printing functions.

(1) The printing terminal is constructed by only an IP (Internet Protocol) communication printing-compatible complex machine 52. The IP communication printing-compatible complex machine 52 is able to directly handle global addresses, such as SIP URIs (explained later). Direct connection of the IP communication printing-compatible complex machine 52 to the broadband network 114, such as the Internet, via a broadband router 50 accordingly enables data transmission to and from an external device on the network 114. The IP communication printing-compatible complex machine 52 alone can thus constitute the printing terminal. The delivered content data is transmitted from the network 114 via the broadband router 50 to the IP communication printing-compatible complex machine 52 as shown by a closed arrow 72. The IP communication printing-compatible complex machine may be replaced by an IP communication printing-compatible printer.

(2) The printing terminal is constructed by a personal computer 54 and a complex machine 56 or a printer 58 directly connected to the personal computer 54 by a USB cable or another equivalent means. The delivered content data is transmitted to the personal computer 54 via the broadband router 50 as shown by a closed arrow 74 and is output to the complex machine 56 or the printer 58.

(3) The printing terminal is constructed by the personal computer 54 and a network-ready complex machine 62 connected to the personal computer 54 via a LAN (local area network) 70 by a LAN cable or another equivalent means. The network-ready complex machine 62 is able to handle private addresses but is unable to handle global addresses. The network-ready complex machine 62 accordingly requires mediation of the personal computer 54 for connection with the network 114 to enable data transmission to and from an external device on the network 114. The delivered content data is transmitted to the personal computer 54 via the broadband router 50 as shown by the closed arrow 74 and is subsequently transmitted to the network-ready complex machine 62 via the LAN 70 as shown by a closed arrow 76. The network-ready complex machine may be replaced by a network-ready printer.

(4) The printing terminal is constructed by the personal computer 54, a network adapter 64 connected to the personal computer 54 via the LAN 70 by a LAN cable or another equivalent means, and a complex machine 66 or a printer 68 connected to the network adapter 64 by a USB cable or another equivalent means. This configuration is effective for non-network-ready complex machines and printers. The delivered content data is transmitted to the personal computer 54 via the broadband router 50 as shown by the closed arrow 74, is subsequently transmitted to the network adapter 64 via the LAN 70 as shown by a closed arrow 78, and is output to the complex machine 66 or the printer 68.

The respective devices may be interconnected by wireless connection, such as a wireless LAN, Bluetooth, or infrared, instead of the wired connection using the cable.

Global IP addresses are allocated on the broadband network 114 like the Internet, while private IP addresses are generally allocated on a private network like the LAN 70. In such cases, there is a NAT (Network Address Translation) traversal problem. As is known in the art, the NAT traversal problem is solved by UPnP (Universal Plug and Play) technique, STUN (Simple Traversal of UDP through NAT) technique, TURN (Traversal Using Relay NAT), or ICE (Interactive Connectivity Establishment) technique.

The complex machine has the scanning and sending functions as mentioned above and can thus be adopted for construction of a sending terminal, as well as a printing terminal. In another example, the sending terminal may be constructed by the personal computer 54 and a scanner 60 directly connected to the personal computer 54 by a USB cable or another equivalent means. In the construction of the sending terminal, the scanned and sent content data is transmitted to the network 114 via a route reverse to the closed arrow.

A-2. System Operation

In the content transmission system of this embodiment, SIP as one type of signaling protocol is used for establishment of a session between devices, and HTTP as one type of data transfer protocol is used for transmission of content data between devices, as explained previously.

In the content transmission system of FIG. 1, the posting server 102 or the printing terminal 108P is activated to make access as an SIP client to the SIP server 104 belonging to the same domain (west.com). Similarly the printing terminal 110P is activated to make access as an SIP client to the SIP server 106 belonging to the same domain (east.com). Each of the posting server 102 and the printing terminals 108P and 110P outputs a registration request to the accessed SIP server 104 or the accessed SIP server 106 and sends information including its own SIP URI and IP address to the accessed SIP server 104 or the accessed SIP server 106 as shown by broken arrows 116, 118, and 120. In this state, the SIP servers 104 and 106 function as both the registrar and the location server. In the SIP server 104 or 106, the CPU 30 accepts the registration request via the communication module 32 and registers the received information as the registration information 36 into the memory 34.

The SIP server 104 accordingly has the registration information of the posting server 102 and the printing terminal 108P belonging to the same domain (west.com). Similarly the SIP server 106 has the registration information of the printing terminal 110P belonging to the same domain (east.com). The registration information 36 includes the SIP URI and the IP address correlated to each terminal and is managed by the CPU 30.

The SIP URI is expressed by, for example, an identifier sequence 'sip:user@west.com'. This identifier sequence has an identifier (scheme) 'sip' representing SIP on the head, a user identifier 'user' in the next place, and a host name 'west.com' after the at mark @. The user identifier may be a user ID or user phone number. The host name may be a fully qualified domain name FQDN or an IP address. The host name may be followed by a port number or another optional parameter. The SIP URI may be replaced by SIPS URI, which is a secure SIP URI. In this case, the scheme on the head is 'sips'.

On completion of the SIP-related advance preparation, SIP-based delivery of content data is enabled.

The company provides content data as an object print content to be delivered and a delivery address list. The sending terminal 112S sends the content data and delivery request information including the delivery address list to the posting server 102 as shown by an open arrow 138 shown in FIG. 1. The posting server 102 temporarily stores the received content data 16 and the received delivery request information 18 into the memory 14 as shown in FIG. 2. API (Application Program Interface) technique is adopted for the transmission of the content data and the delivery request information from the sending terminal 112S to the posting server 102. The transmission protocol HTTP is used for the transmission of the content data and the delivery request information in this embodiment, but may be replaced by another data transfer protocol, such as FTP (File Transfer Protocol).

The CPU 10 of the posting server 102 reads out the delivery request information 18 and analyzes the delivery address list included in the delivery request information 18. The delivery address list includes the SIP URIs of the printing terminals 108P and 110P as delivery destinations. The CPU 10 of the posting server 102 first sets a delivery destination to the printing terminal 110P based on the analyzed delivery address list and sends a request to the SIP server 104 belonging to the same domain (west.com) as the posting server 102 (solid arrow 122). In this state, the SIP server 104 functions as the proxy server. The SIP server 104 belongs to the different domain (west.com) from the domain (east.com) of the printing terminal 110P and does not have the registration information relating to the printing terminal 110P. The SIP server 104 then transfers the received request to the SIP server 106 belonging to the same domain (east.com) as the printing terminal 110P (solid arrow 126). The SIP server 106 also functions as the proxy server. The SIP server 106 belongs to the same domain (east.com) as the printing terminal 110P and has the registration information relating to the printing terminal 110P. The SIP server 106 then refers to the registration information and relays the transferred request to the printing terminal 110P (solid arrow 128). The printing terminal 110P sets a return destination to the posting server 102 and sends a response to the request to the SIP server 106 (solid arrow 132). The SIP server 106 belongs to the different domain (east.com) from the domain (west.com) of the posting server 102 and does not have the registration information relating to the posting server 102. The SIP server 106 then transfers the received response to the SIP server 104 belonging to the same domain (west.com) as the posting server 102 (solid arrow 134). The SIP server 104 belongs to the same domain (west.com) as the posting server 102 and has the registration information relating to the posting server 102. The SIP server 104 then refers to the registration information and relays the transferred response to the posting server 102 (solid arrow 136). The transmission of requests and responses between the posting server 102 and the printing terminal 110P in this manner establishes a session between the posting server 102 and the printing terminal 110P. In this state, both the SIP servers 104 and 106 function as the proxy servers to mediate the session establishment. The details of the request and response transmission are shown in FIG. 6.

Figure 6:
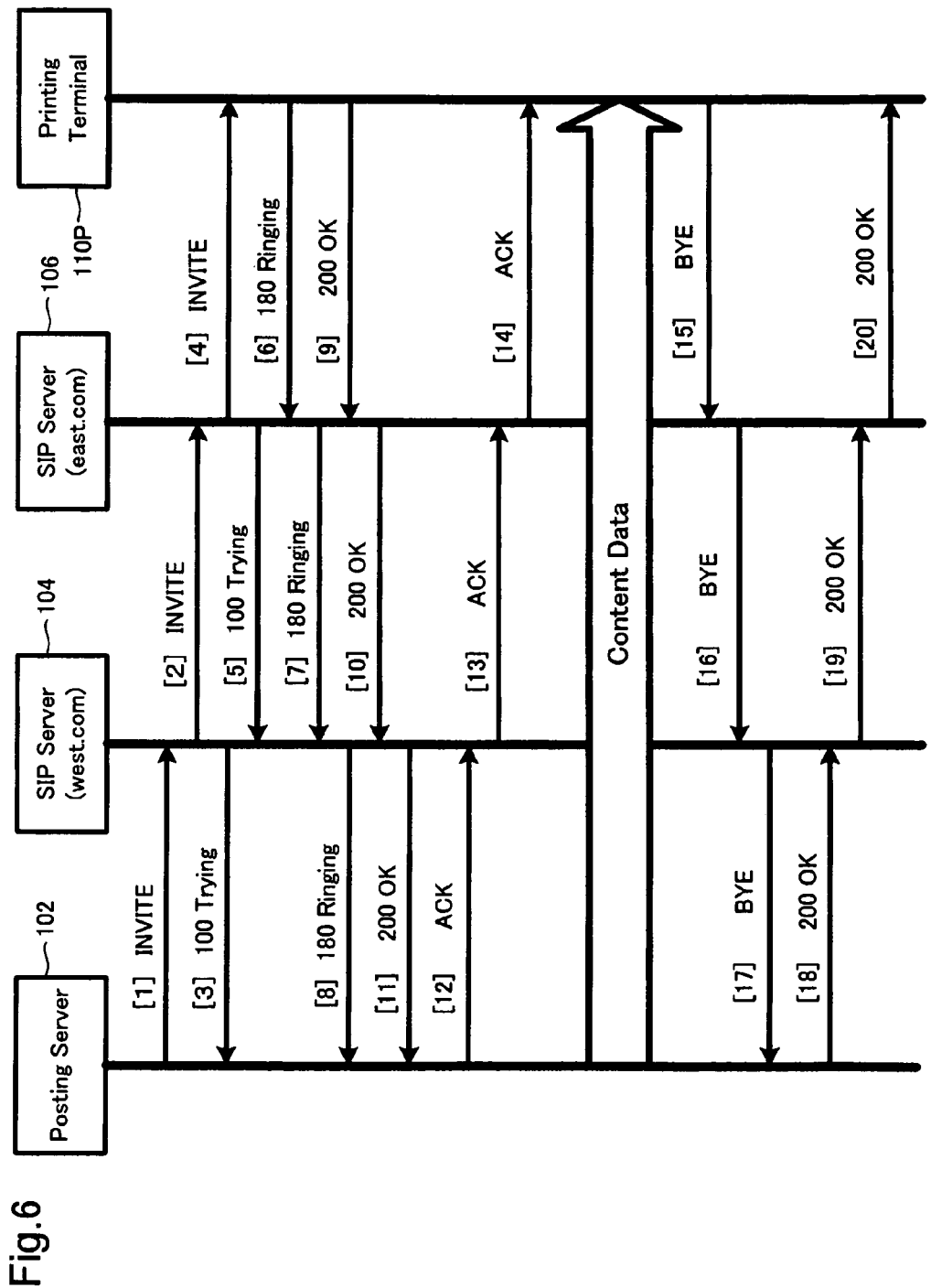
FIG. 6 shows a sequence of session establishment between the posting server and the printing terminal in the content transmission system of FIG. 1.

FIG. 6 shows a sequence of session establishment between the posting server 102 and the printing terminal 110P in the content transmission system of FIG. 1. The time flows from the top to the bottom of FIG. 6, and the processing sequence goes in the order of numbers in the brackets.

In order to notify the printing terminal 110P of the IP address of the posting server 102, the posting server 102 includes the own IP address in the body of an INVITE request message, which is to be sent to the printing terminal 110P. Similarly in order to notify the posting server 102 of the IP address of the printing terminal 110P, the printing terminal 110P includes the own IP address in the body of a 200 OK response message, which is to be sent to the pointing server 102.

When an ACK request message sent from the posting server 102 reaches the printing terminal 110P, a session is established between the posting server 102 and the printing terminal 110P.

The posting server 102 obtains the IP address of the printing terminal 110P from the received 200 OK response message and makes direct access to the printing terminal 110P based on the IP address of the printing terminal 110P without requiring mediation by the SIP servers 104 and 106 to deliver the content data in the 'push' type according to the HTTP protocol as shown by an open arrow 142 in FIG. 1.

On completion of reception of the delivered content data, the printing terminal 110P again adopts the SIP protocol and sends a BYE request message to the posting server 102 via the SIP servers 104 and 106. The posting server 102 receives the BYE request message and sends back a 200 OK response message to the printing terminal 110P via the SIP servers 104 and 106. This closes the session between the posting server 102 and the printing terminal 110P.

The CPU 10 of the posting server 102 subsequently sets a delivery destination to the printing terminal 108P belonging to the same domain (west.com) as the posting server 102 based on the analyzed delivery address list and sends a request to the SIP server 104 (solid arrow 122). The SIP server 104 belongs to the same domain (west.com) as the printing terminal 108P and has the registration information relating to the printing terminal 108P. The SIP server 104 then refers to the registration information and relays the received request to the printing terminal 108P (solid arrow 124). The printing terminal 108P sets a return destination to the posting server 102 and sends a response to the request to the SIP server 104 (solid arrow 130). The SIP server 104 belongs to the same domain (west.com) as the posting server 102 and has the registration information relating to the posting server 102. The SIP server 104 then refers to the registration information and relays the received response to the posting server 102 (solid arrow 136). The transmission of requests and responses between the posting server 102 and the printing terminal 108P in this manner establishes a session between the posting server 102 and the printing terminal 108P. In this state, the SIP server 104 functions as the proxy server to mediate the session establishment. The sequence of session establishment between the posting server 102 and the printing terminal 108P is readily understandable from FIG. 6 and is thus not specifically illustrated.

On establishment of the session between the posting server 102 and the printing terminal 108P, the posting server 102 makes direct access to the printing terminal 108P based on the IP address of the printing terminal 108P without requiring mediation by the SIP server 104 to deliver the content data in the 'push' type according to the HTTP protocol as shown by an open arrow 140 in FIG. 1.

On completion of delivery of the content data, the posting server 102 and the printing terminal 108P transmit a BYE request message and a 200 OK response message to close the session between the posting server 102 and the printing terminal 108P.

Each of the printing terminals 108P and 110P activates its printing functions to perform a printing operation based on the delivered content data and output the print content. The print content is thus delivered to the individual customers managing the respective printing terminals 108P and 110P.

The SIP servers 104 and 106 also function as the presence servers. The CPU 30 of the SIP server 104 obtains information regarding the status of the printing terminal 108P belonging to the same domain (west.com) via the communication module 32. Similarly the CPU 30 of the SIP server 106 obtains information regarding the status of the printing terminal 110P belonging to the same domain (east.com) via the communication module 32. As shown in FIG. 3, the CPU 30 stores and manages the obtained information as the printer status information 38 in the memory 34 in the respective SIP servers 104 and 106. The CPU 30 of the SIP server 104 or 106 provides the posting server 102 with requested information taken out of the stored printer status information 38, in response to a request from the posting server 102. The posting server 102 is thus notified of the statuses of the printing terminals 108P and 110P.

A-3. Effects of Embodiment

The content transmission system of this embodiment utilizes the broadband network 114, such as the Internet, for transmission of the content data. This arrangement enables low-cost and high-speed delivery of the content data. High-performance printers and complex machines managed by the respective customers are usable as the printing terminals to enable high-quality printing. The use of the posting server 102 requires the company to provide only the content data as the object print content to be delivered and the delivery address list. This desirably saves the manpower and reduces the financial burden. The use of the posting server 102 also enables delivery of mass print contents. The push-type delivery of the content data by the posting server 102 allows the individual customers to automatically receive the print contents without any specific operations.

B. Second Embodiment

B-1. System Configuration

Figure 7:
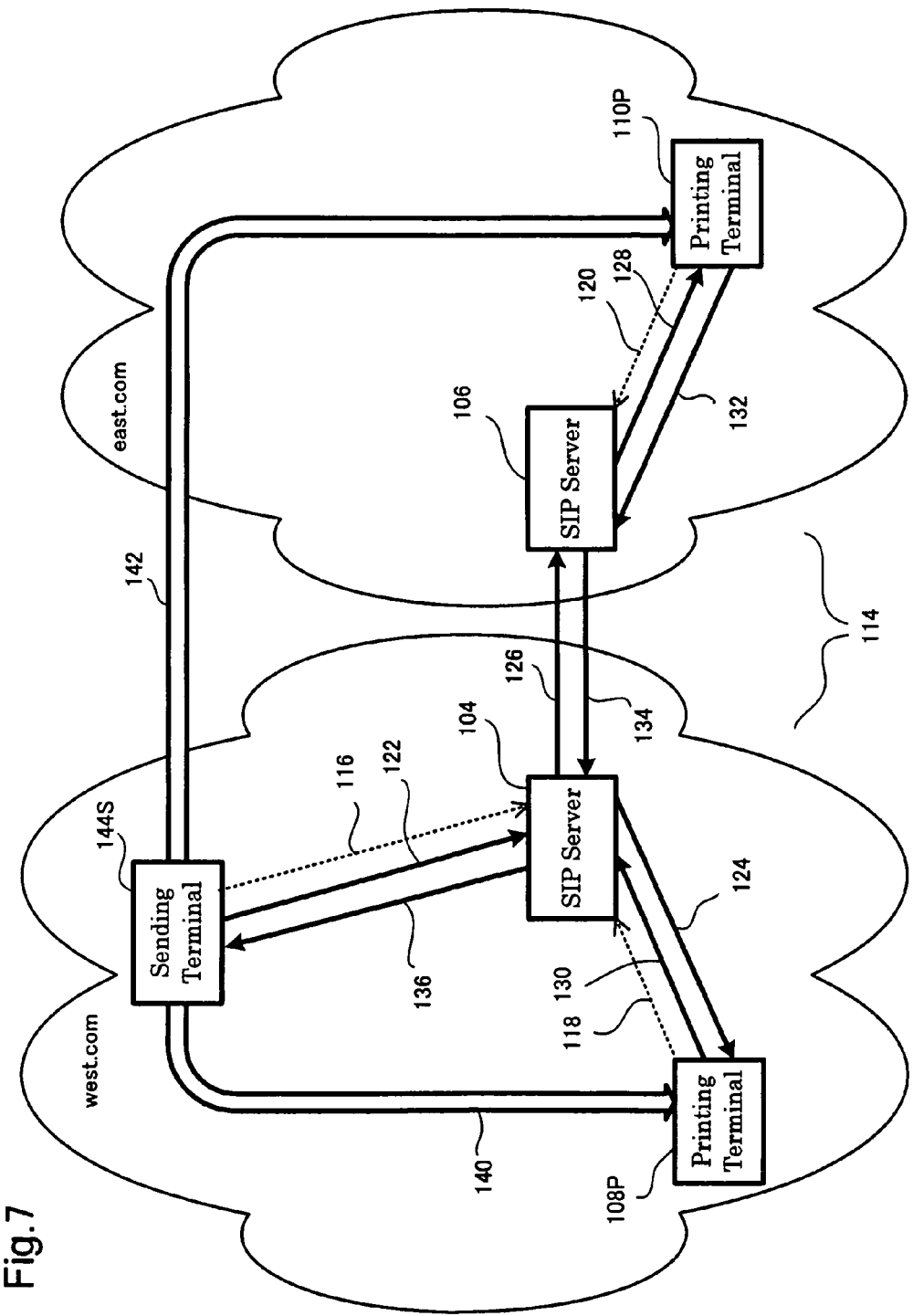
FIG. 7 is a block diagram schematically illustrating the configuration of a content transmission system in a second embodiment of the invention.

FIG. 7 is a block diagram schematically illustrating the configuration of a content transmission system in a second embodiment of the invention.

As shown in FIG. 7, the difference of the content transmission system of the second embodiment from the content transmission system of the first embodiment is that a sending terminal 144S managed by the company desiring delivery of print contents directly delivers content data to the printing terminals 108P and 110P managed by the individual customers without using a posting server. Namely the sending terminal 144S managed by the company has the functions of the posting server. The posting server 102 included in the content transmission system of FIG. 1 is thus omitted from the content transmission system of FIG. 7. Otherwise the content transmission system of the second embodiment has the similar configuration to that of the content transmission system of the first embodiment. The same constituents are expressed by the like numerals and are not specifically described here.

B-2. System Operation

As in the content transmission system of the first embodiment, in the content transmission system of the second embodiment, SIP as one type of signaling protocol is used for establishment of a session between devices, and HTTP as one type of data transfer protocol is used for transmission of content data between devices.

In the content transmission system of FIG. 7, the sending terminal 144S is activated to make access as an SIP client to the SIP server 104 belonging to the same domain (west.com). The sending terminal 144S issues a registration request to the accessed SIP server 104 and sends information including its own SIP URI and IP address to the accessed SIP server 104 as shown by a dotted arrow 116. The SIP server 104 accepts the registration request and registers the information received from the sending terminal 144S as the registration information 36 in the memory 34. As explained previously with regard to the first embodiment, the registration information regarding the printing terminal 108P and the registration information regarding the printing terminal 110P are respectively registered in the SIP server 104 and in the SIP server 106.

The company provides content data as an object print content to be delivered and a delivery address list and stores the content data and the delivery address list into a memory of the sending terminal 144S. The sending terminal 144S performs a series of operations similar to those of the posting server 102 of the first embodiment to delivery the content data to the printing terminals 108P and 110P according to the delivery address list.

Each of the printing terminals 108P and 110P activates its printing functions to perform a printing operation based on the delivered content data and output the print content. The print content is thus delivered to the individual customers managing the respective printing terminals 108P and 110P.

As in the content transmission system of the first embodiment, in the content transmission system of the second embodiment, the SIP servers 104 and 106 respectively obtain the information regarding the status of the printing terminal 108P and the information regarding the status of the printing terminal 110P and store and manage the obtained information as the printer status information 38. The SIP servers 104 and 106 provide the sending terminal 144S with requested information taken out of the stored printer status information 38, in response to a request from the sending terminal 144S. The sending terminal 144S is thus notified of the statuses of the printing terminals 108P and 110P.

B-3. Effects of Embodiment

Like the content transmission system of the first embodiment, the content transmission system of the second embodiment utilizes the broadband network 114, such as the Internet, for delivery of the content data. This arrangement enables very low-cost delivery of the content data. High-performance printers and complex machines managed by the respective customers are usable as the printing terminals to enable high-quality printing.

C. Third Embodiment

C-1. System Configuration

Figure 8:
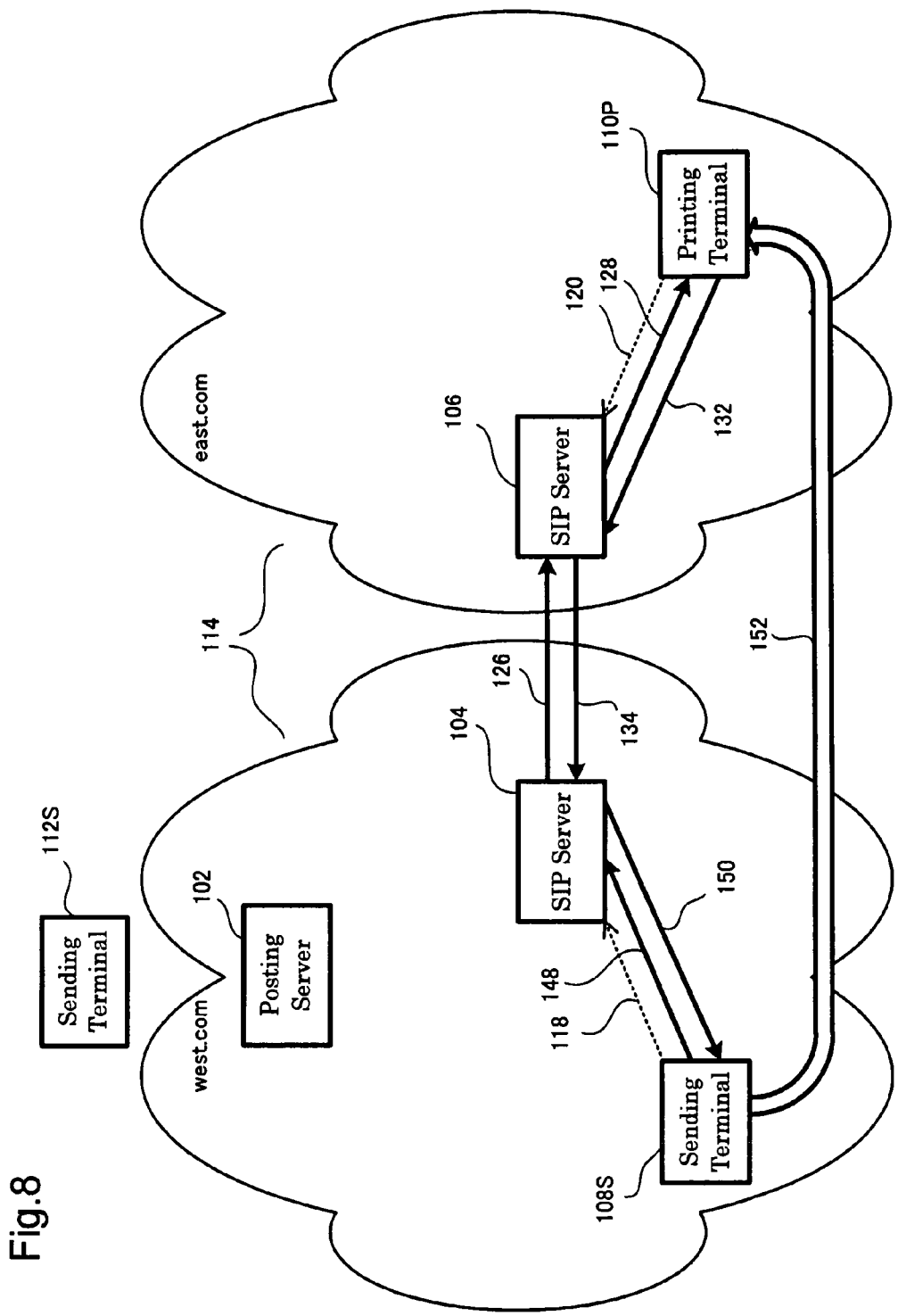
FIG. 8 is a block diagram schematically illustrating the configuration of a content transmission system in a third embodiment of the invention.

FIG. 8 is a block diagram schematically illustrating the configuration of a content transmission system in a third embodiment of the invention.

As shown in FIG. 8, the difference of the content transmission system of the third embodiment from the content transmission system of the first embodiment is to enable transmission of print contents between customers. In the content transmission system of the third embodiment, a sending terminal 108S managed by one customer is arranged to enable direct transmission of content data to a printing terminal 110P managed by another customer. The sending terminal 108S may be identical with the printing terminal 108P or may be different from the printing terminal 108P. In the former case, for example, a complex machine may be used as both the sending terminal and the printing terminal. In another example of the former case, both a scanner and a printer are connected ton one personal computer. The content transmission system of the third embodiment other than the sending terminal 108S has the similar configuration to that of the content transmission system of the first embodiment. The same constituents are expressed by the like numerals and are not specifically described here.

C-2 System Operation

As in the content transmission system of the first embodiment, in the content transmission system of the third embodiment, SIP as one type of signaling protocol is used for establishment of a session between devices, and HTTP as one type of data transfer protocol is used for transmission of content data between devices.

In the content transmission system of FIG. 8, the sending terminal 108S is activated to make access as an SIP client to the SIP server 104 belonging to the same domain (west.com). The sending terminal 108S issues a registration request to the accessed SIP server 104 and sends information including its own SIP URI and IP address to the accessed SIP server 104 as shown by a dotted arrow 118. The SIP server 104 accepts the registration request and registers the information received from the sending terminal 108S as the registration information 36 in the memory 34. As explained previously with regard to the first embodiment, the registration information regarding the printing terminal 110P is similarly registered in the SIP server 106.

A client desiring delivery of a print content operates the sending terminal 108S to scan the print content in the form of content data by its scanner or scanning function and store the scanned content data into a memory of the sending terminal 108S.

The customer subsequently operates an input unit (not shown) of the sending terminal 108S to enter SIP URI of the printing terminal 110P as a transmission destination. The sending terminal 108S sets a transmission destination to the printing terminal 110P based on the entered SIP URI and sends a request to the SIP server 104 belonging to the same domain (west.com) as the sending terminal 108S (solid arrow 148). The SIP server 104 belongs to the different domain (west.com) from the domain (east.com) of the printing terminal 110P and does not have the registration information relating to the printing terminal 110P. The SIP server 104 then transfers the received request to the SIP server 106 belonging to the same domain (east.com) as the printing terminal 110P (solid arrow 126). The SIP server 106 belongs to the same domain (east.com) as the printing terminal 110P and has the registration information relating to the printing terminal 110P. The SIP server 106 then refers to the registration information and relays the transferred request to the printing terminal 110P (solid arrow 128). The printing terminal 110P sets a return destination to the sending terminal 108S and sends a response to the request to the SIP server 106 (solid arrow 132). The SIP server 106 belongs to the different domain (east.com) from the domain (west.com) of the sending terminal 108S and does not have the registration information relating to the sending terminal 108S. The SIP server 106 then transfers the received response to the SIP server 104 belonging to the same domain (west.com) as the sending terminal 108S (solid arrow 134). The SIP server 104 belongs to the same domain (west.com) as the sending terminal 108S and has the registration information relating to the sending terminal 108S. The SIP server 104 then refers to the registration information and relays the transferred response to the sending terminal 108S (solid arrow 150). The transmission of requests and responses between the sending terminal 108S and the printing terminal 110P in this manner establishes a session between the sending terminal 108S and the printing terminal 110P. In this state, both the SIP servers 104 and 106 function as the proxy servers to mediate the session establishment.

On establishment of the session between the sending terminal 108S and the printing terminal 110P, the sending terminal 108S makes direct access to the printing terminal 110P based on the IP address of the printing terminal 110P without requiring mediation by the SIP servers 104 and 106 to transmit the content data according to the HTTP protocol as shown by an open arrow 152 in FIG. 8.

On completion of transmission of the content data, the sending terminal 108S and the printing terminal 110P transmit requests and responses to close the session between the sending terminal 108S and the printing terminal 110P.

The printing terminal 110P activates its printing functions to perform a printing operation based on the transmitted content data and output the print content. The print content is thus transmitted to the customer managing the printing terminal 110P.

As in the content transmission system of the first embodiment, in the content transmission system of the third embodiment, the SIP server 106 obtains the information regarding the status of the printing terminal 110P and stores and manages the obtained information as the printer status information 38. The SIP server 106 provides the sending terminal 108S with requested information taken out of the stored printer status information 38, in response to a request from the sending terminal 108S. The sending terminal 108S is thus notified of the status of the printing terminal 110P.

C-3. Effects of Embodiment

Like the content transmission system of the first embodiment, the content transmission system of the third embodiment utilizes the broadband network 114, such as the Internet, for delivery of the content data. This arrangement enables low-cost transmission of the content data. A high-performance printer or a complex machine managed by the customer is usable as the printing terminal to enable high-quality printing.

D. Modifications 1

In the content transmission systems of the first and the second embodiments, the content data is delivered from the company to the respective customers. There may also be a requirement for transmission of content data from the respective customers to the company. For example, the company delivers a material for distance learning to the respective customers, and the respective customers send back their answer sheets to the company. Such transmission of content data from the respective customers to the company is implemented according to the procedure of the transmission of content data between the customers explained in the third embodiment.

Figure 9:
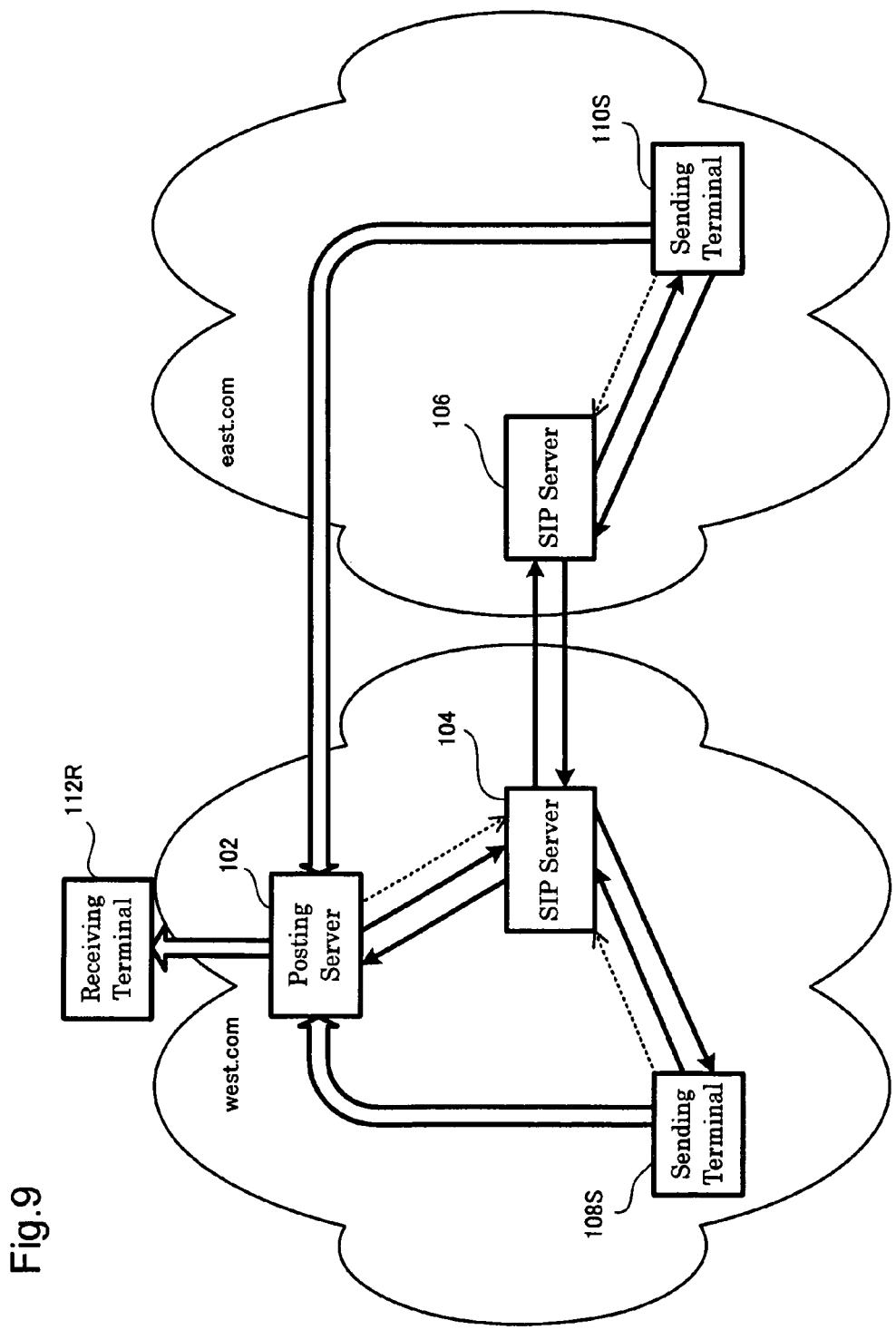
FIG. 9 is a block diagram showing transmission of content data from respective customers to a company in one modification of the first embodiment.
Figure 10:
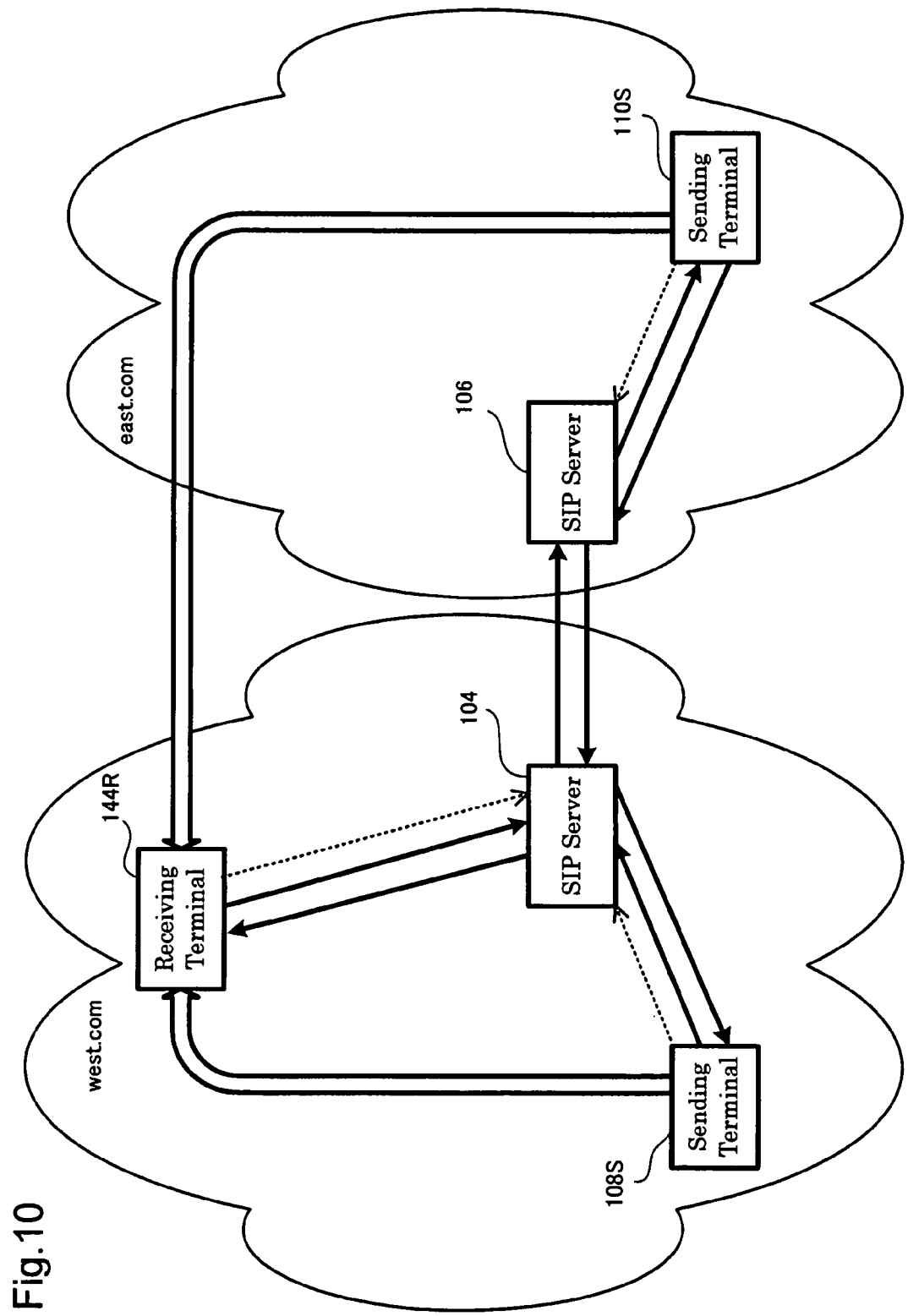
FIG. 10 is a block diagram showing transmission of content data from respective customers to a company in one modification of the second embodiment.

FIG. 9 is a block diagram showing transmission of content data from respective customers to a company in one modification of the first embodiment. FIG. 10 is a block diagram showing transmission of content data from respective customers to a company in one modification of the second embodiment. In these modified examples, sending terminals 108S and 110S may be identical with the printing terminals 108P and 110P or may be different from the printing terminals 108P and 110P. Receiving terminals 112R and 144R may be identical with the sending terminals 112S and 144S or may be different from the sending terminals 112S and 144S. Otherwise the content transmission systems of the modified examples shown in FIGS. 9 and 10 respectively have the similar configurations to those of the content transmission systems of the first embodiment and of the second embodiment. The same constituents are expressed by the like numerals and are not specifically described here.

As in the content transmission system of the third embodiment described above, the respective customers operate input units (not shown) of the sending terminals 108S and 110S to enter SIP URI of the posting server 102 or SIP URI of the receiving terminal 144R as a transmission destination. The sending terminals 108S and 110S transmit requests and responses via the SIP servers 104 and 106 to and from the posting server 102 or the receiving terminal 144R according to the entered SIP URI to establish sessions between the sending terminals 108S and 110S and the posting server 102 or the receiving terminal 144R.

On establishment of the sessions between the sending terminals 108S and 110S and the posting server 102 or the receiving terminal 144R, the sending terminals 108S and 110S make direct accesses to the posting server 102 or to the receiving terminal 144R based on the IP address of the posting server 102 or the IP address of the receiving terminal 144R without requiring mediation by the SIP servers 104 and 106 to transmit the content data according to the HTTP protocol as shown by open arrows in FIG. 9 or in FIG. 10.

On completion of transmission of the content data, the sending terminals 108S and 110S and the posting server 102 or the receiving terminal 144R transmit requests and responses to close the sessions between the sending terminals 108S and 110S and the posting server 102 or the receiving terminal 144R.

The posting server 102 or the receiving terminal 144R manages the transmitted content data. In the content transmission system of FIG. 9, the posting server 102 may notify the receiving terminal 112R in the company of the result of the management according to the requirement. The posting server 102 manages, for example, returns of answer sheets from respective customers set to delivery destinations of a material for distance learning.

The content transmission systems of these modified examples enable transmission of content data from the respective customers to the company.

In the content transmission systems of the embodiments and their modified example, two domains (west.com and east.com) are present on the network 114. This number of domains is, however, not restrictive, but only one domain or three or more domains may be present on the network.

In the content transmission systems of the embodiments and their modified example, the network 114 is the Internet or another broadband network. This is, however, not restrictive, but the network 114 may be a company LAN. Such modification holds for subsequent embodiments discussed below.

E. Fourth Embodiment

A facsimile device at a receiver may have a 'Print After' function to check a received print content on its display prior to actually printing the received print content. In facsimile transmission of a print content to such a facsimile device, the sender can not confirm whether the transmitted print content is actually printed at the receiver. For the purpose of confirmation, the sender and the receiver may come to some arrangement to check for actual printing of the transmitted print content by phone calls before the transmission and after the reception or to send back a printout of the transmitted print content from the receiver to the sender. In facsimile transmission service, such as the Internet fax, completion of reception of a transmitted print content at the receiver may be fed back to the sender. The sender is, however, unable to check whether the transmitted print content is actually printed or is deleted without printing or whether the print content is to be redelivered due to some error. These problems undesirably increase the loads of both the sender and the receiver in delivery of print contents, and lower the efficiency and the reliability of content delivery.

In a content transmission system of a fourth embodiment, in the course of delivery of a print content, a posting server occasionally collects information on the status of content data as a delivery object, manages the collected information as delivery record information, and notifies the sender of the result of the management. This arrangement enables the sender to check whether the transmitted print content is actually printed.

E-1. System Configuration

Figure 11:
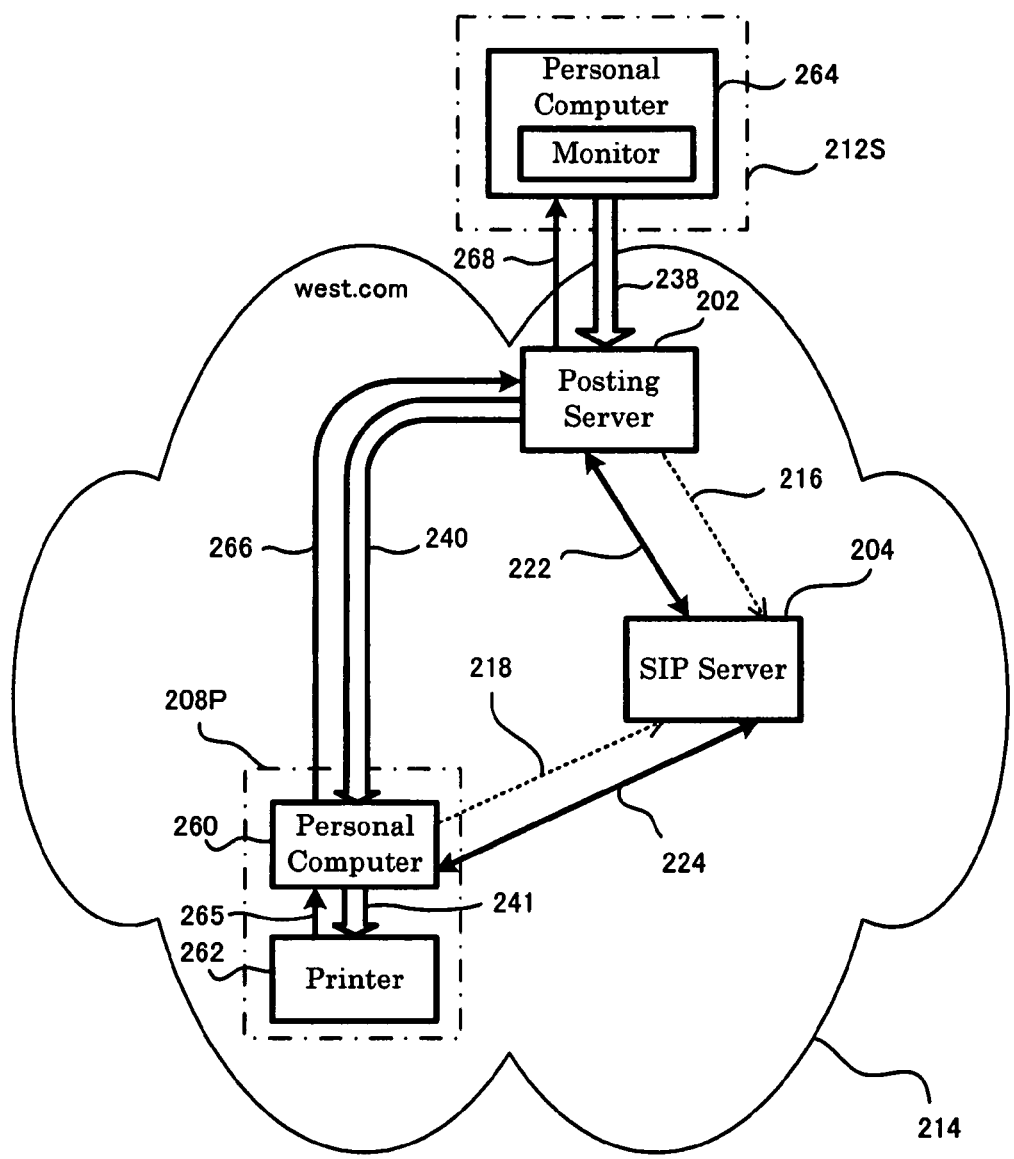
FIG. 11 is a block diagram schematically illustrating the configuration of a content transmission system in a fourth embodiment of the invention.

FIG. 11 is a block diagram schematically illustrating the configuration of the content transmission system in the fourth embodiment of the invention.

As shown in FIG. 11, the content transmission system of the fourth embodiment has a sending terminal 212S managed by a company (sender) desiring delivery of print contents, a posting server 202 and an SIP server 204 managed by a network service provider, and a printing terminal 208P managed by a customer (receiver). The sending terminal 212S is constructed by a personal computer 264 equipped with a monitor. The printing terminal 208P is constructed by a personal computer 260 and a printer 262. In the content transmission system of the fourth embodiment, the printing terminal 208P may have any of the configurations shown in FIG. 5.

The posting server 202, the SIP server 204, and the printing terminal 208P are interconnected via a broadband network 214, such as the Internet. The sending terminal 212S may be connected with the posting server 202 via a broadband network or may otherwise be connected with the posting server 202 via a leased line.

In the network 214 shown in FIG. 11, the posting server 202, the SIP server 204, and the printing terminal 208P belong to a west.com domain. For the simplicity of explanation, only one domain is present on the network 214 in this embodiment. The number of domains on the network is, however, not restricted to one. There may be two domains like the first through the third embodiments or a greater number of domains on the network. Such modification holds for subsequent embodiments discussed later.

Figure 12:
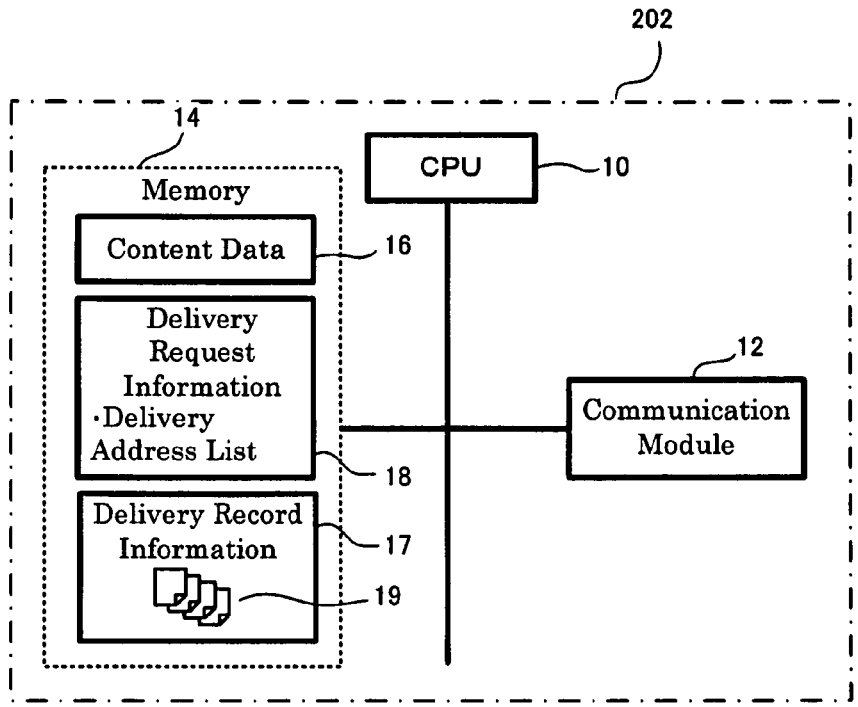
FIG. 12 is a block diagram showing the primary structure of a posting server included in the content transmission system of FIG. 11.

FIG. 12 is a block diagram showing the primary structure of the posting server 202 included in the content transmission system of FIG. 11. As shown in FIG. 12, the structure of the posting server 202 is basically the same as the structure of the posting server 102 of the first embodiment shown in FIG. 2, except storage of delivery record information 17 in the memory 14. The delivery record information 17 consists of multiple delivery result information 19. Otherwise the structure of the posting server 202 is similar to the structure of the posting server 102 shown in FIG. 2 and is thus not specifically described here.

Figure 13:
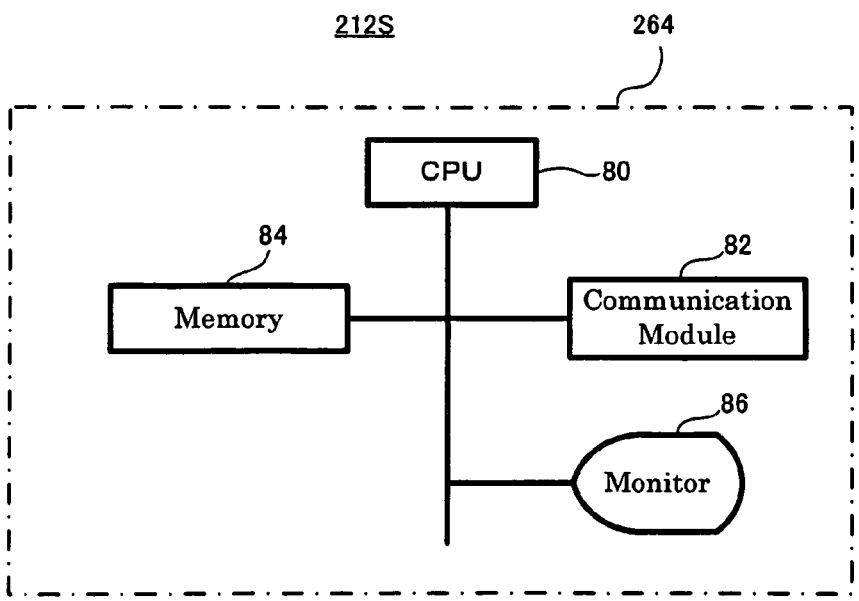
FIG. 13 is a block diagram showing the primary structure of a sending terminal included in the content transmission system of FIG. 11.

FIG. 13 is a block diagram showing the primary structure of the sending terminal 212S included in the content transmission system of FIG. 11. The sending terminal 212S is constructed by the personal computer 264 as mentioned above and mainly includes a CPU 80 configured to perform diversity of processing operations and controls according to programs, a communication module 82 configured to transmit various data and information to and from other devices via a network, a memory 84 configured to store programs as well as data and information therein, and a monitor 86 configured to display obtained data and information. The personal computer 264 also has an input unit, such as a keyboard and a pointing device, and other required units, although these additional components are omitted from the illustration.

In the content transmission system of this embodiment, the memory 14 of the posting server 202 and the monitor 86 of the sending terminal 212S respectively correspond to the storage unit and the display unit of the invention. The CPU 10 and the communication module 12 in the posting server 202 function in the cooperative manner to be equivalent to the receiver module, the delivery module, and the notification module of the invention.

E-2. System Operation

As in the content transmission systems of the first through the third embodiments, in the content transmission system of the fourth embodiment, SIP as one type of signaling protocol is used for establishment of a session between devices, and HTTP as one type of data transfer protocol is used for transmission of content data between devices. Registration information of the posting server 202 and the printing terminal 208P have been registered in advance in the SIP server 204.

Figure 14:
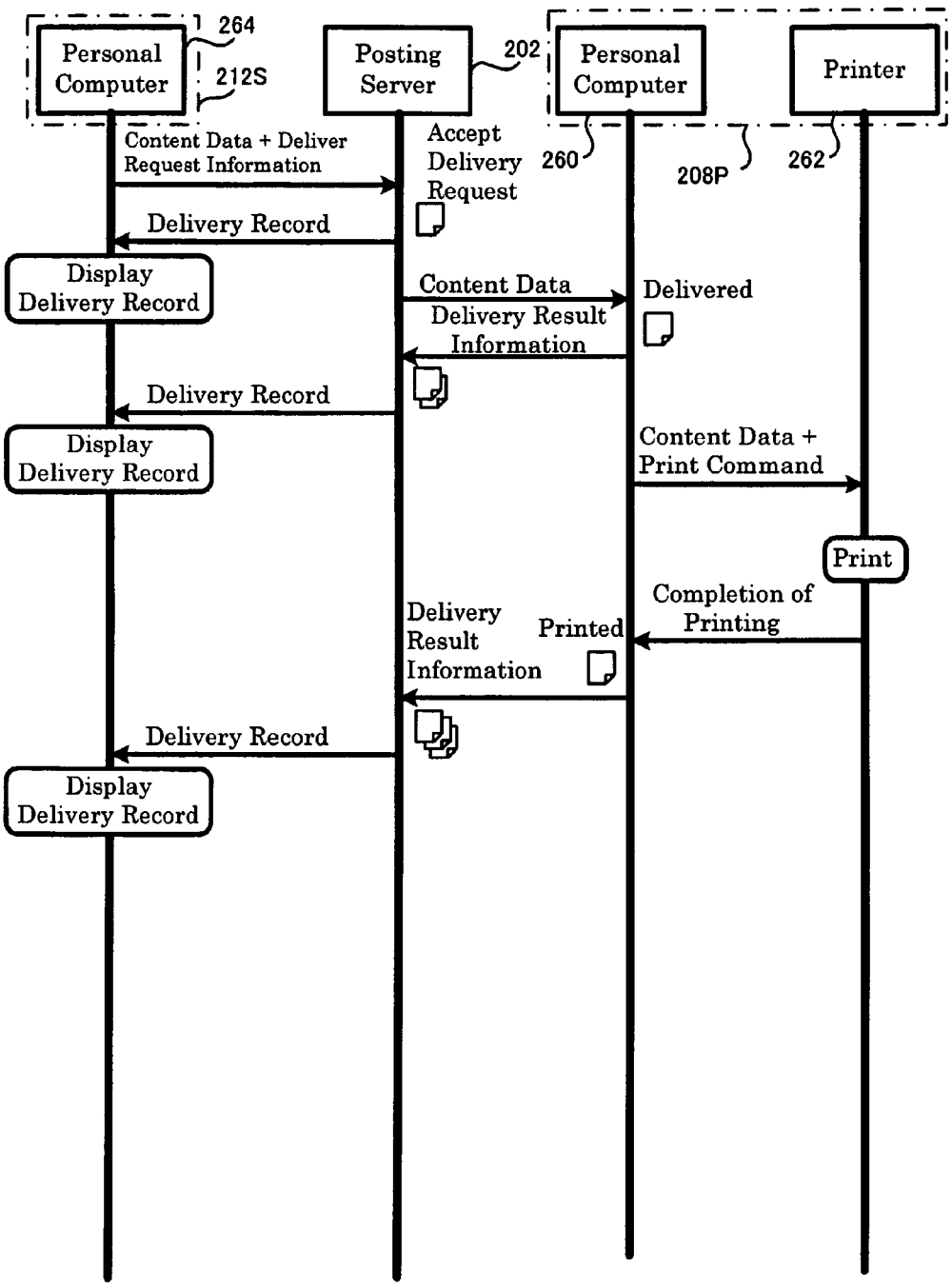
FIG. 14 schematically shows transmission of data and information between the sending terminal, the posting server, and a printing terminal in the content transmission system of FIG. 11.

FIG. 14 schematically shows transmission of data and information between the sending terminal 212S, the posting server 202, and the printing terminal 208P in the content transmission system of FIG. 11. The time flows from the top to the bottom of FIG. 14.

The company provides content data as an object print content to be delivered and a delivery address list. The personal computer 264 of the sending terminal 212S sends the content data and delivery request information including the delivery address list to the posting server 202 as shown by an open arrow 238 shown in FIG. 11. The CPU 10 of the posting server 202 temporarily stores the received content data 16 and the received delivery request information 18 into the memory 14 as shown in FIG. 12. The CPU 10 of the posting server 202 creates delivery result information 19 of the received content data and stores the created delivery result information 19 as delivery record information 17 of the content data into the memory 14.

The delivery result information 19 includes:
1) information on a sender (for example, name and IP address of the sender);
2) information on a receiver (for example, name and IP address of the receiver);
3) a file name of content data;
4) a status of the content data;
5) a storage location of the content data; and
6) a time when the content data is in the status (4).

In the content transmission system of the embodiment, the storage location (5) of the content data may be the posting server 202 or the personal computer 260/printer 262 of the printing terminal 208P.

The content data may be in one of the following statuses (4) according to the storage location (5) of the content data:
a) When the storage location of the content data is the posting server 202,
 Accepted for delivery
 Waiting for redelivery
 Delivery error
b) When the storage location of the content data is the personal computer 260/printer 262,
 Delivered
 Printed
 Deleted
 Print error The time (6) when the content data is in the status (4) may be a time of acceptance for the status of accepted for delivery, a time of receipt for the status of delivered, or a time of error occurrence for the status of delivery error or print error.

In this stage, the CPU 10 of the posting server 202 accepts the delivery request for the content data and creates the delivery result information 19 including the following pieces of information:
 Status (4): Accepted for delivery
 Storage Location (5): Posting server
 Time (6): Time of acceptance The CPU 10 of the posting server 202 stores and manages the delivery record information 17 with regard to each content data as an object of a delivery request.

The CPU 10 of the posting server 202 subsequently reads out the delivery record information 17 and notifies the personal computer 264 of the sending terminal 212S of the delivery record information 17 via the communication module 12 (solid arrow 268 in FIG. 11). The CPU 80 of the personal computer 264 receives the notified delivery record information via the communication module 82 and stores the received delivery record information into the memory 84. The CPU 80 of the personal computer 264 reads out the delivery record information and graphically displays the details of the delivery record information on the monitor 86.

The CPU 10 of the posting server 202 reads out the delivery request information 18 and analyzes the delivery address list included in the delivery request information. The CPU 10 of the posting server 202 refers to the analyzed delivery address list and transmits requests and responses from and to the personal computer 260 of the printing terminal 208P via the SIP server 204 (solid arrows 222 and 224 in FIG. 11) to establish a session between the posting server 202 and the printing terminal 208P.

On establishment of the session between the posting server 202 and the printing terminal 208P, the posting server 202 makes direct access to the personal computer 260 of the printing terminal 208P based on the IP address of the printing terminal 208P without requiring mediation by the SIP server 204 to deliver the content data in the 'push' type according to the HTTP protocol as shown by an open arrow 240 in FIG. 11. As shown in FIG. 14, the personal computer 260 of the printing terminal 208P receives the delivered content data, stores the received content data into a memory (not shown), creates delivery result information, and sends the created delivery result information to the posting server 202 according to the HTTP protocol (solid arrow 266 in FIG. 11).

In this stage, the personal computer 260 of the printing terminal 208P receives the content data from the posting server 202 and creates the delivery result information including the following pieces of information:
 Status (4): Delivered
 Storage Location (5): Personal computer/printer
 Time (6): Time of receipt The CPU 10 of the posting server 202 receives the delivery result information via the communication module 12 from the personal computer 260 of the printing terminal 208P, adds the received delivery result information to the delivery record information 17, and stores the updated delivery record information 17 into the memory 14.

The CPU 10 of the posting server 202 then reads out the delivery record information 17 and notifies the personal computer 264 of the sending terminal 212S of the delivery record information. The CPU 80 of the personal computer 264 displays the details of the notified delivery record information on the monitor 86.

In the printing terminal 208P, the personal computer 260 sends the received content data and a print command to the printer 262 (open arrow 241 in FIG. 11), and the printer 262 performs a printing operation according to the received content data. The personal computer 260 makes the received content data subjected to a required series of processing and converts the content data into a data format printable by the printer 262. On completion of the printing operation, the printer 262 notifies the personal computer 260 of completion of printing (solid arrow 265). As shown in FIG. 14, the personal computer 260 receives the notification, creates delivery result information, and sends the created delivery result information to the posting server 202 according to the HTTP protocol (solid arrow 266 in FIG. 11).

In this stage, the personal computer 260 of the printing terminal 208P receives the notification of completion of printing from the printer 262 and creates the delivery result information including the following pieces of information:
 Status (4): Printed
 Storage Location (5): Printer
 Time (6): Time of printing The CPU 10 of the posting server 202 receives the delivery result information via the communication module 12 from the personal computer 260 of the printing terminal 208P, adds the received delivery result information to the delivery record information 17, and stores the updated delivery record information 17 into the memory 14. The CPU 10 of the posting server 202 then notifies the personal computer 264 of the sending terminal 212S of the updated delivery record information 17. The CPU 80 of the personal computer 264 displays the details of the notified delivery record information on the monitor 86.

This is the normal processing flow when the printing operation is normally performed based on the content data. The following describes a processing flow when an error occurs in the course of delivery to printing of content data.

Figure 15:
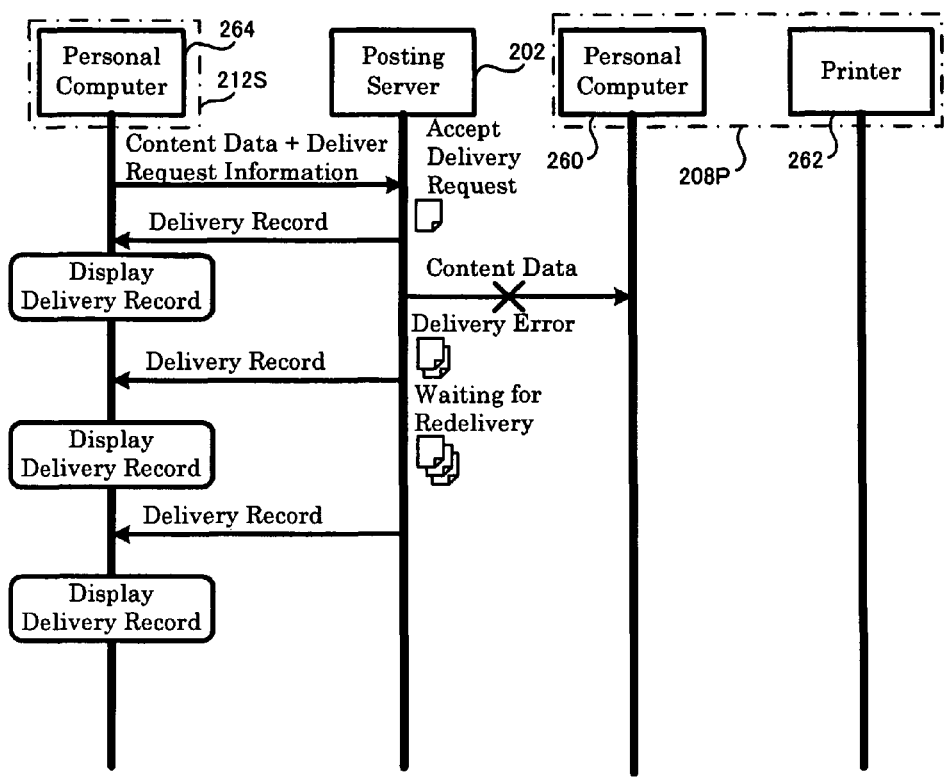
FIG. 15 schematically shows transmission of data and information between the sending terminal, the posting server, and the printing terminal in the event of a delivery error in the content transmission system of FIG. 11.

FIG. 15 schematically shows transmission of data and information between the sending terminal 212S, the posting server 202, and the printing terminal 208P in the event of a delivery error in the content transmission system of FIG. 11. In the example of FIG. 15, the posting server 202 fails to deliver content data to the personal computer 260 of the printing terminal 208P. In this case, the CPU 10 of the posting server 202 creates delivery result information 19 with regard to the content data, adds the created delivery result information 19 to the delivery record information 17, and stores the updated delivery record information 17 into the memory 14.

In this stage, the CPU 10 of the posting server 202 fails to deliver the content data and creates the delivery result information 19 including the following pieces of information:
 Status (4): Delivery error, Detail of error
 Time (6): Time of error occurrence The CPU 10 of the posting server 202 then notifies the personal computer 264 of the sending terminal 212S of the updated delivery record information 17. The CPU 80 of the personal computer 264 displays the details of the notified delivery record information on the monitor 86.

In response to the failed delivery of the content data, the CPU 10 of the posting server 202 starts a redelivery operation, creates delivery result information 19, adds the created delivery result information 19 to the delivery record information 17, and stores the updated delivery record information 17 into the memory 14.

The content data is in the status of waiting for redelivery. The CPU 10 of the posting server 202 accordingly creates the delivery result information 19 including the following piece of information:
 Status (4): Waiting for redelivery The CPU 10 of the posting server 202 then notifies the personal computer 264 of the sending terminal 212S of the updated delivery record information 17. The CPU 80 of the personal computer 264 displays the details of the notified delivery record information on the monitor 86.

Figure 16:
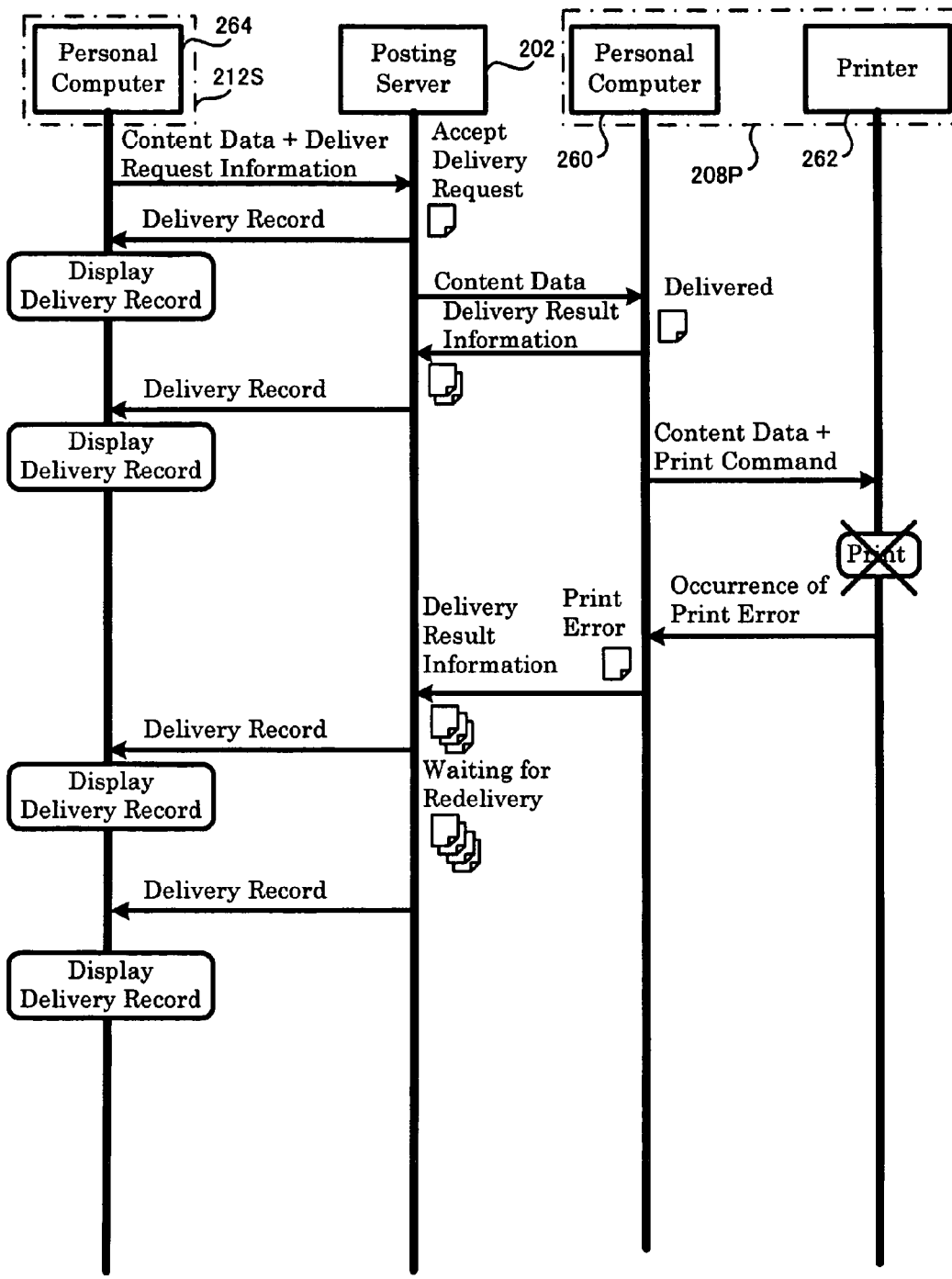
FIG. 16 schematically shows transmission of data and information between the sending terminal, the posting server, and the printing terminal in the event of a print error in the content transmission system of FIG. 11.

FIG. 16 schematically shows transmission of data and information between the sending terminal 212S, the posting server 202, and the printing terminal 208P in the event of a print error in the content transmission system of FIG. 11. In the example of FIG. 16, the printer 262 of the printing terminal 208P fails to perform a printing operation based on content data. In this case, the printer 262 notifies the personal computer 260 of the printing terminal 208P of the occurrence of a print error. The personal computer 260 receives the notification, creates delivery result information, and sends the created delivery result information to the posting server 202 according to the HTTP protocol.

The personal computer 260 of the printing terminal 208P is notified of the occurrence of a print error and creates the delivery result information including the following pieces of information:
 Status (4): Print error, Detail of error
 Time (6): Time of error occurrence The CPU 10 of the posting server 202 receives the delivery result information, adds the received delivery result information to the delivery record information 17, and stores the updated delivery record information 17 into the memory 14. The CPU 10 of the posting server 202 then notifies the personal computer 264 of the sending terminal 212S of the updated delivery record information 17. The CPU 80 of the personal computer 264 displays the details of the notified delivery record information on the monitor 86. The notified information may be only required pieces of information included in the delivery record information or may be all the pieces of the delivery record information with regard to the content data. This also holds for subsequent embodiments discussed later.

In the case of direct printing based on content data, irrespective of the failed printing operation by the printer 262, the delivered content data is lost in the printing terminal 208P. The CPU 10 of the posting server 202 accordingly starts a redelivery operation, creates delivery result information 19, adds the created delivery result information 19 to the delivery record information 17, and stores the updated delivery record information 17 into the memory 14. The subsequent processing flow is identical with that of FIG. 15 and is thus not specifically explained here.

Figure 17:
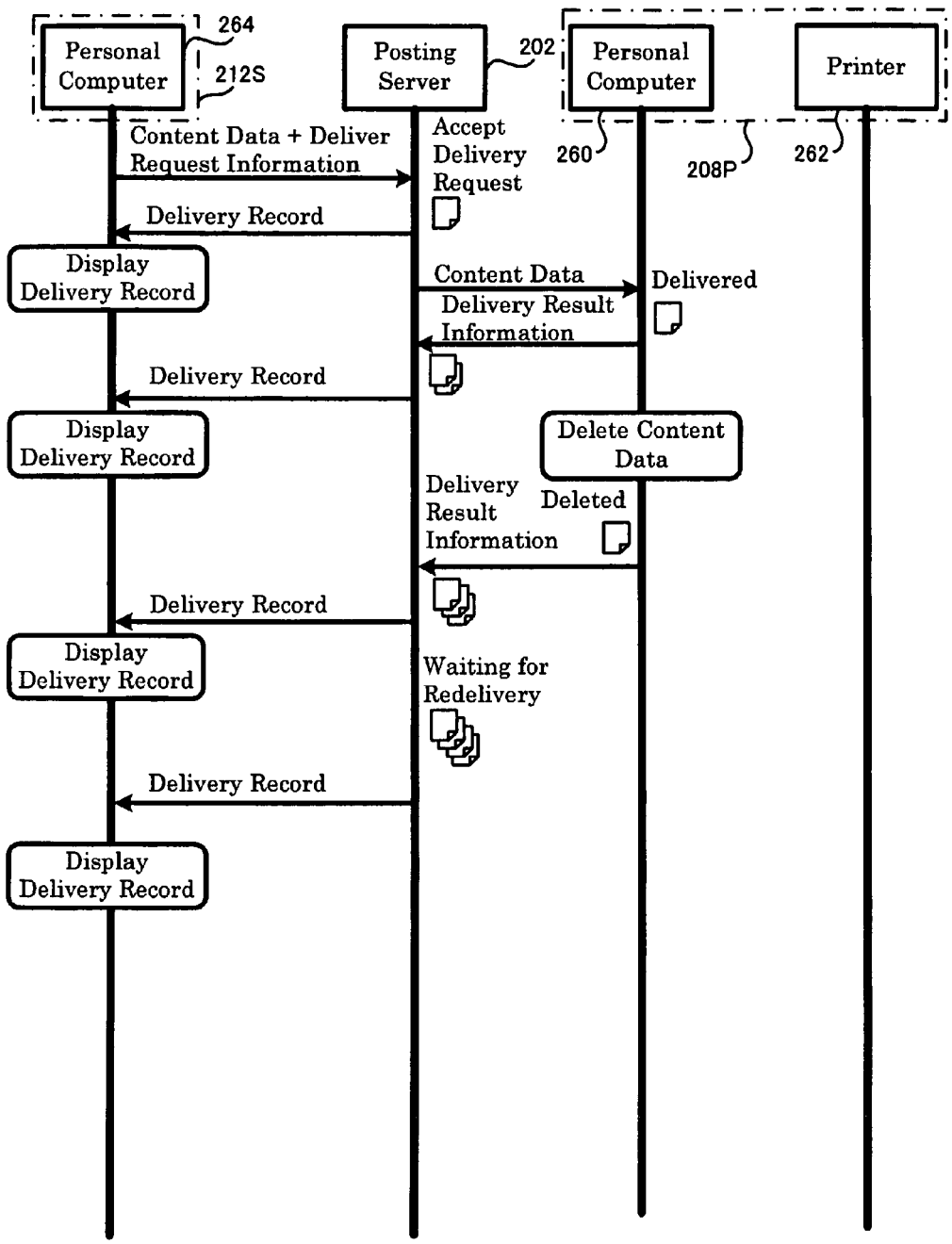
FIG. 17 schematically shows transmission of data and information between the sending terminal, the posting server, and the printing terminal in the event of deletion of content data in the content transmission system of FIG. 11.

FIG. 17 schematically shows transmission of data and information between the sending terminal 212S, the posting server 202, and the printing terminal 208P in the event of deletion of content data in the content transmission system of FIG. 11. In the example of FIG. 17, the personal computer 260 of the printing terminal 208P deletes delivered content data prior to its printing operation, in response to the user's (the receiver's) instruction. In this case, the personal computer 260 creates delivery result information and sends the created delivery result information to the posting server 202 according to the HTTP protocol.

The personal computer 260 of the printing terminal 208P deletes the content data and creates the delivery result information including the following pieces of information:

Status (4): Deleted

Time (6): Time of deletion

The CPU 10 of the posting server 202 receives the delivery result information, adds the received delivery result information to the delivery record information 17, and stores the updated delivery record information 17 into the memory 14. The CPU 10 of the posting server 202 then notifies the personal computer 264 of the sending terminal 212S of the updated delivery record information 17. The CPU 80 of the personal computer 264 displays the details of the notified delivery record information on the monitor 86.

Since the delivered content data is deleted prior to its printing operation, the CPU 10 of the posting server 202 starts a redelivery operation, creates delivery result information 19, adds the created delivery result information 19 to the delivery record information 17, and stores the updated delivery record information 17 into the memory 14. The subsequent processing flow is identical with that of FIG. 15 and is thus not specifically explained here.

In the content transmission system of this embodiment, the sending terminal 212S (personal computer 264) as the sender (company) receives the notification from the posting server 202, obtains the delivery record information with regard to the content data as the object of delivery, and displays the details of the obtained delivery record information on the monitor.

In place of or in addition to this series of processing, the sending terminal 212S (personal computer 264) as the sender may make access to the posting server 202 at regular intervals to obtain the delivery record information with regard to the content data as the object of delivery and display the details of the obtained delivery record information on the monitor.

E-3. Effects of Embodiment

In the content transmission system of the fourth embodiment described above, in the course of delivery of a print content, the posting server 202 occasionally collects information on the status of content data as the delivery object, manages the collected information as delivery record information, and notifies the sender of the result of the management. This arrangement enables the sender to check whether the transmitted print content is actually printed and thereby effectively enhances the reliability of content delivery.

F. Fifth Embodiment

In the content transmission system of the fourth embodiment, the posting server is directly notified of the information on the status of content data as the delivery object by the printing terminal as the delivery destination. In another arrangement, the posting server may receive the information from an SIP server. As explained in the first embodiment, the SIP server has the function of the presence server to obtain information on the status of a printing terminal as printer status information and provide required pieces of information taken out of the printer status information in response to a request from the posting server.

In a content transmission system of a fifth embodiment, in the course of delivery of a print content, a posting server receives information on the status of a printing terminal as a delivery destination from an SIP server functioning as the presence server to confirm whether the printing terminal is in a printable state. The posting server also occasionally collects information on the status of the printing terminal after delivery of the print content, manages the collected information as delivery record information, and notifies the sender of the result of the management. This arrangement enables the sender to check whether the print content is successfully printed without any error.

F-1. System Configuration

Figure 18:
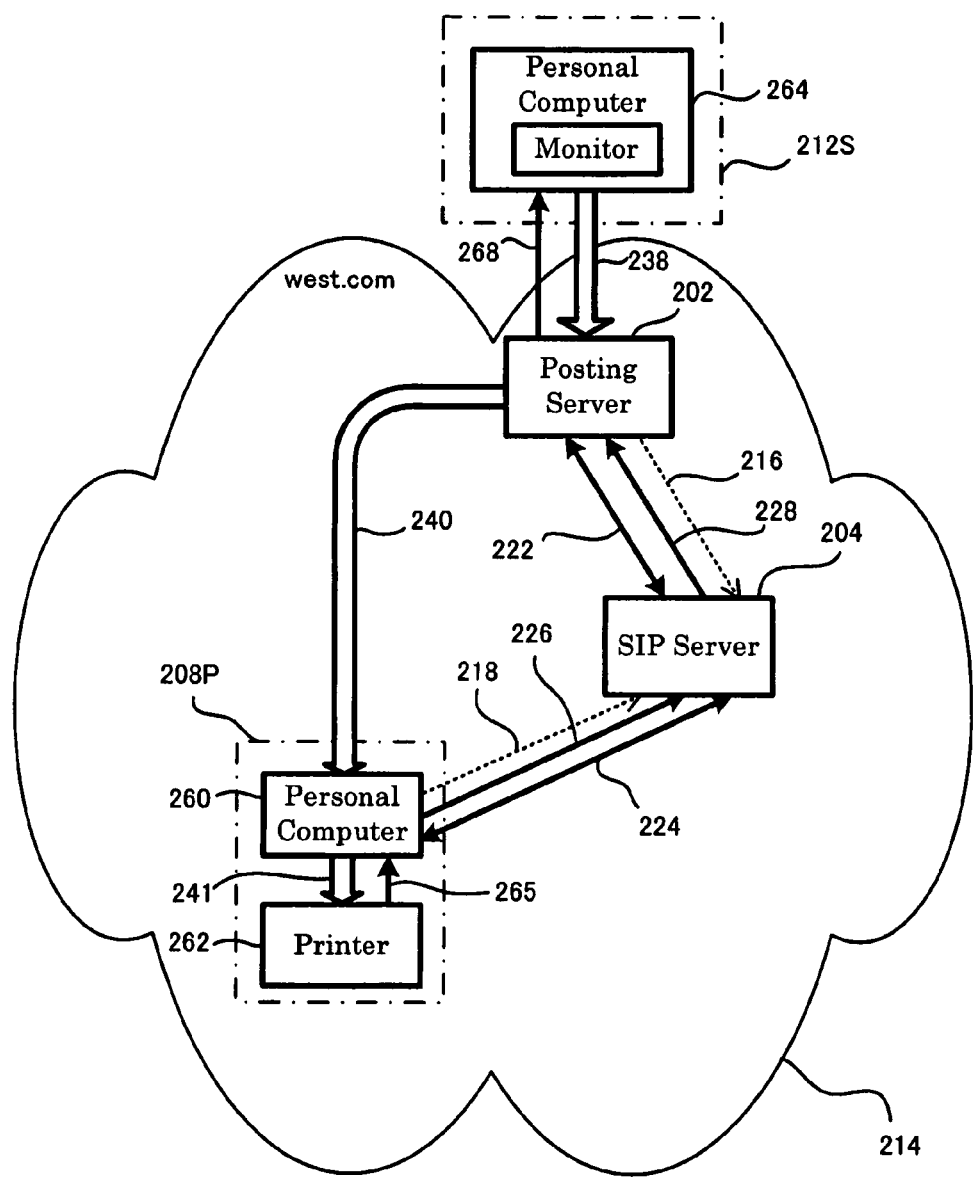
FIG. 18 is a block diagram schematically illustrating the configuration of a content transmission system in a fifth embodiment of the invention.

FIG. 18 is a block diagram schematically illustrating the configuration of the content transmission system in the fifth embodiment of the invention.

As shown in FIG. 18, the difference of the content transmission system of the fifth embodiment from the content transmission system of the fourth embodiment is that the SIP server 204 functions as the presence server to obtain information on the status of the printing terminal 208P as printer status information from the printing terminal 208P and provide the posting server 202 with the printer status information. The posting server 202 receives the information on the status of the printing terminal 208P from the SIP server 204 in the content transmission system of the fifth embodiment, while the posting server 202 directly receives the delivery result information from the printing terminal 208P in the content transmission system of the fourth embodiment. The SIP server 204 has the same structure as those of the SIP servers 104 and 106 of the first embodiment shown in FIG. 3. Otherwise the content transmission system of the fifth embodiment has the similar configuration to that of the content transmission system of the fourth embodiment. The same constituents are expressed by the like numerals and are not specifically described here. In the content transmission system of the fifth embodiment, the printing terminal 208P may have any of the configurations shown in FIG. 5.

F-2. System Operation

Figure 19:
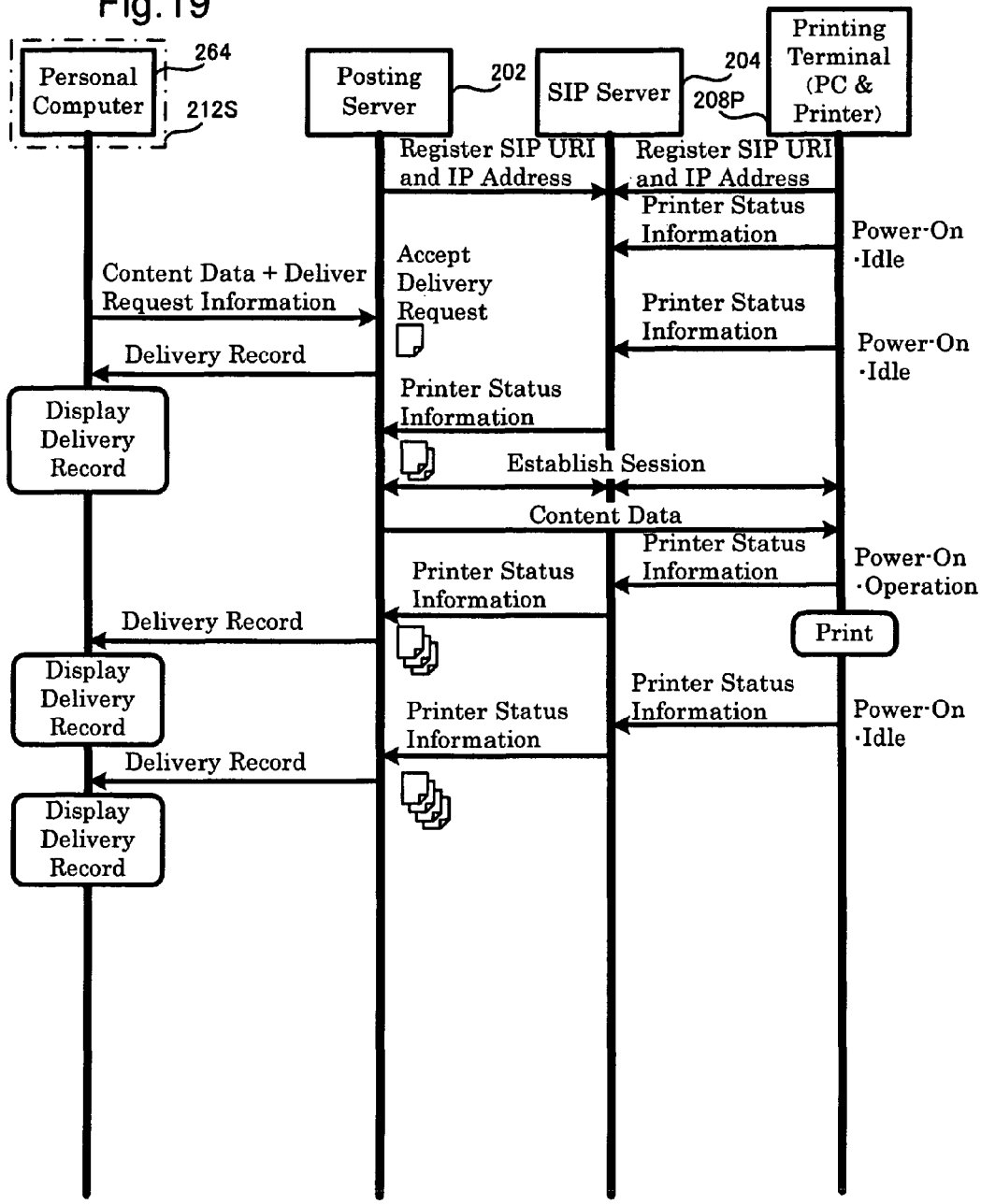
FIG. 19 schematically shows transmission of data and information between a sending terminal, a posting server, an SIP server, and a printing terminal in the content transmission system of FIG. 18.

FIG. 19 schematically shows transmission of data and information between the sending terminal 212S, the posting server 202, the SIP server 204, and the printing terminal 208P in the content transmission system of FIG. 18. The time flows from the top to the bottom of FIG. 19. In FIG. 19, PC represents the personal computer 260 of the printing terminal 208P.

As shown in FIG. 19, the posting server 202 and the printing terminal 208P are respectively activated to make access to the SIP server 204 belonging to the same domain (west.com), output a registration request to the accessed SIP server 204, and send information including its own SIP URI and IP address to the accessed SIP server 204 (broken arrows 216 and 218 in FIG. 18). In this state, the SIP server 204 accepts the registration requests and registers the received information as registration information.

On completion of the SIP-related advance preparation, the SIP server 204 functions as the presence server. The CPU 30 of the SIP server 204 obtains information on the status of the printing terminal 208P belonging to the same domain (west-.com) via the communication module 32 (solid arrow 226 in FIG. 18) and stores and manages the obtained information as the printer status information 38 in the memory 34 as shown in FIG. 3.

The printer status information (information on the status of the printing terminal) includes, for example, the following pieces of information:

Online information: representing the power-on state or the power-off state of the printer;

Operation status information: representing the idle state, the operation state, or the stop state of the printer (idle state: in a standby condition, operation state: during a printing operation, stop state: on the occurrence of an error or in a cover-open condition);

Ink information (Toner information): representing the out-of-ink (out-of-toner) state or the state of ink presence;

Paper information: representing the out-of-paper state or the state of paper presence;

Paper discharge information: representing the full or non-full state of a printer paper discharge outlet; and Error information: representing the detail of an error if occurring in the printer.

The printer status information may additionally include warning information like 'the printer ink (toner) is running out'. The printer status information is not restricted to the information on the printer but may also include information on the personal computer connected with the printer. The printer status information may further include the information on the status of the content data (for example, 'printed' or 'deleted') explained above in the fourth embodiment.

As shown in FIG. 19, the printer status information obtained by the SIP server 204 after registration of the information including the SIP URIs and the IP addresses represents the power-on state and the idle state.

When there is a change in status of the printer 262, the personal computer 260 notifies the SIP server 204 of the printer status information. This enables the SIP server 204 to obtain the printer status information. The personal computer 260 occasionally receives required pieces of information from the printer 262 (solid arrow 265 in FIG. 18) and notifies the SIP server 204 of the printer status information, which is created based on the received pieces of information.

In another arrangement, the SIP server 204 may make access (poll) to the personal computer 260 at regular intervals to obtain the printer status information from the personal computer 260.

On completion of a printing operation based on delivered content data by the printer 262, the personal computer 260 notifies the SIP server 204 of the printer status information, with a view to initializing the information stored in the SIP server 204.

The company provides content data as an object print content to be delivered and a delivery address list. The personal computer 264 of the sending terminal 212S sends the content data and delivery request information including the delivery address list to the posting server 202 (open arrow 238 shown in FIG. 18). The CPU 10 of the posting server 202 temporarily stores the received content data 16 and the received delivery request information 18 into the memory 14 as shown in FIG. 12. The CPU 10 of the posting server 202 then accepts a delivery request of the content data, creates delivery result information 19 with regard to the content data, and stores the created delivery result information 19 as the delivery record information 17 into the memory 14.

The CPU 10 of the posting server 202 subsequently reads out the delivery record information 17 and notifies the personal computer 264 of the sending terminal 212S of the delivery record information 17 via the communication module 12 (solid arrow 268 in FIG. 18). The CPU 80 of the personal computer 264 receives the notified delivery record information and graphically displays the details of the delivery record information on the monitor 86.

The CPU 10 of the posting server 202 reads out the delivery request information 18 and analyzes the delivery address list included in the delivery request information. The CPU 10 of the posting server 202 refers to the analyzed delivery address list and sends a request to the SIP sever 204 to provide the printer status information on the printing terminal 208P as the delivery destination. The CPU 30 of the SIP server 204 accepts the request, reads out the printer status information 38 on the printing terminal 208P from the memory 34 as shown in FIG. 3, and provides the posting server 202 with the printer status information (solid arrow 228 in FIG. 18). The CPU 10 of the posting server 202 receives the provided printer status information, adds the received printer status information to the delivery record information 17, and stores the updated delivery record information 17 into the memory 14. This arrangement notifies the posting server 202 of the status of the printing terminal 208P.

The posting server 202 analyzes the provided printer status information and determines whether the printing terminal 208P as the delivery destination is in a printable state or in an unprintable state. The posting server 202 determines that the printing terminal 208P is in the printable state when the printer status information represents the power-on state and the idle state, while otherwise determining that the printing terminal 208P is in the unprintable state. Upon determination that the printing terminal 208P is in the printable state, the posting server 202 transmits requests and responses to and from the personal computer 260 of the printing terminal 208P via the SIP server 204 (solid arrows 222 and 224 in FIG. 18) to establish a session for delivery of content data. Upon determination that the printing terminal 208P is in the unprintable state, on the other hand, the posting server 202 does not start delivery of content data to the printing terminal 208P but stands by.

On establishment of the session between the posting server 202 and the printing terminal 208P, the posting server 202 makes direct access to the personal computer 260 of the printing terminal 208P based on the IP address of the printing terminal 208P without requiring mediation by the SIP server 204 to deliver the content data in the 'push' type according to the HTTP protocol (open arrow 240).

In the printing terminal 208P, the personal computer 260 sends the received content data and a print command to the printer 262 (open arrow 241 in FIG. 18), and the printer 262 performs a printing operation according to the received content data and outputs a resulting print content. The personal computer 260 makes the received content data subjected to a required series of processing and converts the content data into a data format printable by the printer 262. On the start of the printing operation, the status of the printer 262 changes from the idle state to the operation state. As shown in FIG. 19, the personal computer 260 notifies the SIP server 204 of the printer status information in response to this change of the status. In this stage, the printer status information represents the power-on state and the operation state.

The CPU 30 of the SIP server 204 receives the updated printer status information from the printing terminal 208P and stores and manages the updated printer status information into the memory 34. In response to a request from the posting server 202 to provide the printer status information on the printing terminal 208P, the CPU 30 of the SIP server 204 reads out the printer status information 38 on the printing terminal 208P from the memory 34 and provides the posting server 202 with the printer status information.

The CPU 10 of the posting server 202 adds the provided printer status information to the delivery record information 17 and stores the updated delivery record information 17 into the memory 14. The CPU 10 of the posting server 202 then notifies the personal computer 264 of the sending terminal 212S of the updated delivery record information 17. The personal computer 264 displays the details of the notified delivery record information on the monitor.

On completion of the printing operation by the printer 262, the status of the printer 262 is changed from the operation state to the idle state. As shown in FIG. 19, the personal computer 260 notifies the SIP server 204 of the printer status information in response to this change of the status. In this stage, the printer status information represents the power-on state and the idle state.

The CPU 30 of the SIP server 204 receives the updated printer status information from the printing terminal 208P and stores and manages the updated printer status information into the memory 34. In response to a request from the posting server 202 to provide the printer status information, the CPU 30 of the SIP server 204 reads out the printer status information 38 from the memory 34 and provides the posting server 202 with the printer status information.

The CPU 10 of the posting server 202 adds the provided printer status information to the delivery record information 17 and stores the updated delivery record information 17 into the memory 14. The CPU 10 of the posting server 202 then notifies the personal computer 264 of the sending terminal 212S of the updated delivery record information 17. The CPU 80 of the personal computer 264 displays the details of the notified delivery record information on the monitor 86.

This is the normal processing flow when the printing operation is normally performed based on the content data. The following briefly describes a processing flow when an error occurs in the printing terminal 208P in the course of the printing operation based on the content data.

In the event of a failed printing operation based on the content data due to the occurrence of an error in the printer 262 of the printing terminal 208P, the status of the printer 262 is changed from the operation state to the stop state. As shown in FIG. 19, the personal computer 260 notifies the SIP server 204 of the printer status information in response to this change of the status. In this stage, the printer status information represents the power-on state and the stop state and includes error information showing the detail of the error.

The CPU 30 of the SIP server 204 receives the printer status information including the error information from the printing terminal 208P in response to the occurrence of the error and stores and manages the printer status information into the memory 34. In response to a request from the posting server 202 to provide the printer status information, the CPU 30 of the SIP server 204 provides the posting server 202 with the printer status information.

The CPU 10 of the posting server 202 receives the provided printer status information, adds the received printer status information to the delivery record information 17, and stores the updated delivery record information 17 into the memory 14. The CPU 10 of the posting server 202 then notifies the personal computer 264 of the sending terminal 212S of the updated delivery record information 17. The CPU 80 of the personal computer 264 displays the details of the notified delivery record information on the monitor 86.

F-3. Effects of Embodiment

In the content transmission system of the fifth embodiment described above, in the course of delivery of a print content, the posting server 202 receives information on the status of the printing terminal 208P (printer status information) as the delivery destination from the SIP server 204 functioning as the presence server to confirm whether the printing terminal 208P is in the printable state. This arrangement ensures successful delivery of content data without an error. The posting server 202 also occasionally collects information on the status of the printing terminal 208P after delivery of the print content from the SIP server 204, manages the collected information as the delivery record information 17, and notifies the sender of the result of the management. This arrangement enables the sender to check whether the print content is successfully printed without any error and thereby effectively enhances the reliability of content delivery.

G. Sixth Embodiment

In the case of delivery of a print content for a limited time from a company (sender) to customers (receivers), the conventional technique stores content data of the print content in a server and permits each customer to download the content data for only the limited time. This conventional technique, however, can not prohibit the customer from freely printing and moving the downloaded content data in the customer's local environment even after the time limit. Namely the conventional technique can not prohibit the customer from utilizing the print content even after the time limit expected by the sender.

In a content transmission system of a sixth embodiment, in delivery of a print content with a time limit, a posting server manages content data in a time limitation manner and adopts the technique of the 'push'-type printing (direct printing) to implement a series of processing from delivery, printing, to deletion of the content data as one communication session. This arrangement prohibits the customer (receiver) from utilizing the print content after a time limit expected by the sender.

G-1. System Configuration

Figure 20:
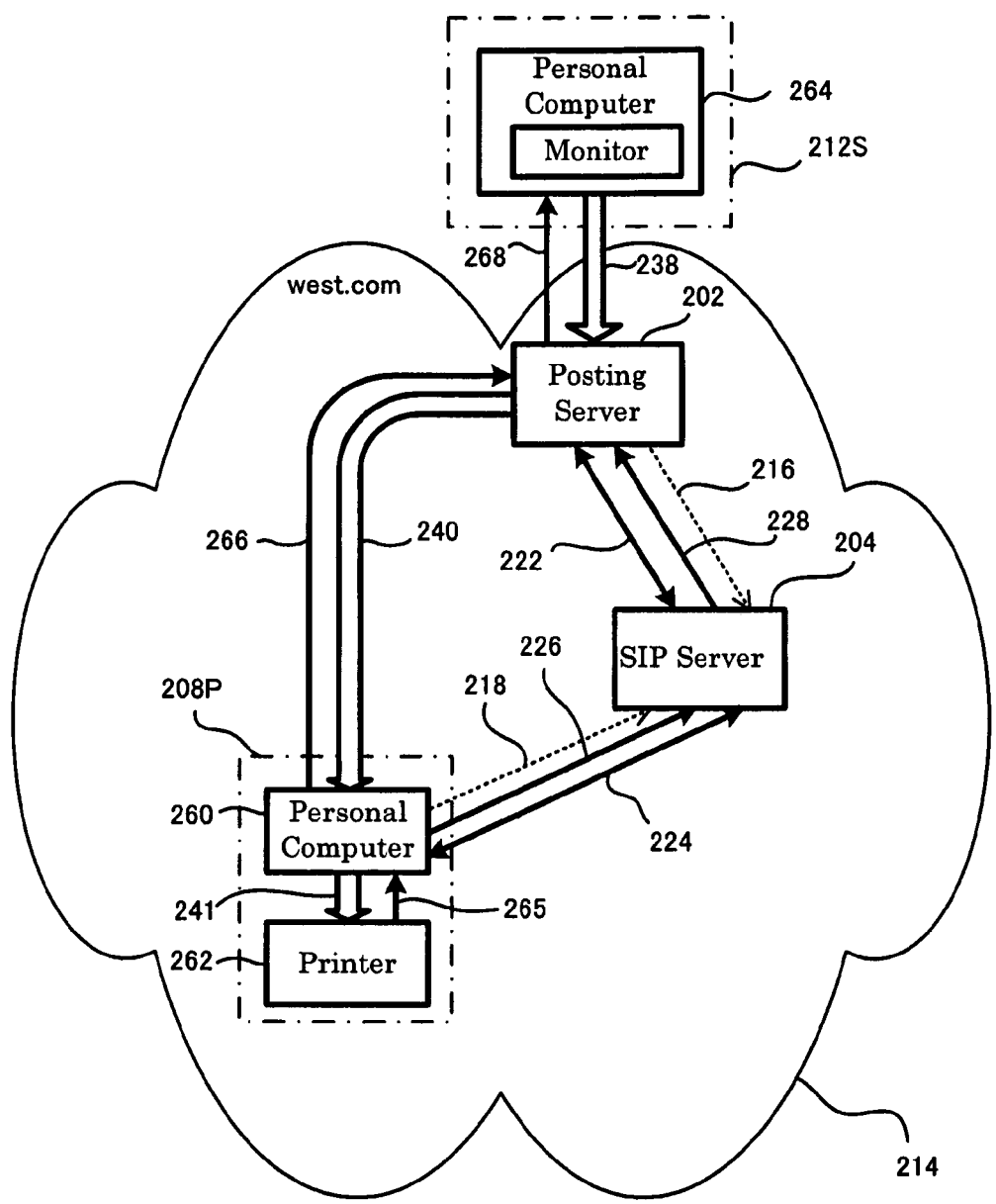
FIG. 20 is a block diagram schematically illustrating the configuration of a content transmission system in a sixth embodiment of the invention.

FIG. 20 is a block diagram schematically illustrating the configuration of the content transmission system in the sixth embodiment of the invention.

The configuration of the content transmission system of the sixth embodiment shown in FIG. 20 is basically similar to that of the content transmission system of the fifth embodiment shown in FIG. 18, except an additional signal line (solid arrow 266) to send delivery result information from the printing terminal 208P to the posting server 202. Otherwise the content transmission system of the sixth embodiment has the same configuration as that of the content transmission system of the fifth embodiment. The same constituents are expressed by the like numerals and are not specifically described here. In the content transmission system of the sixth embodiment, the printing terminal 208P may have any of the configurations shown in FIG. 5.

Figure 21:
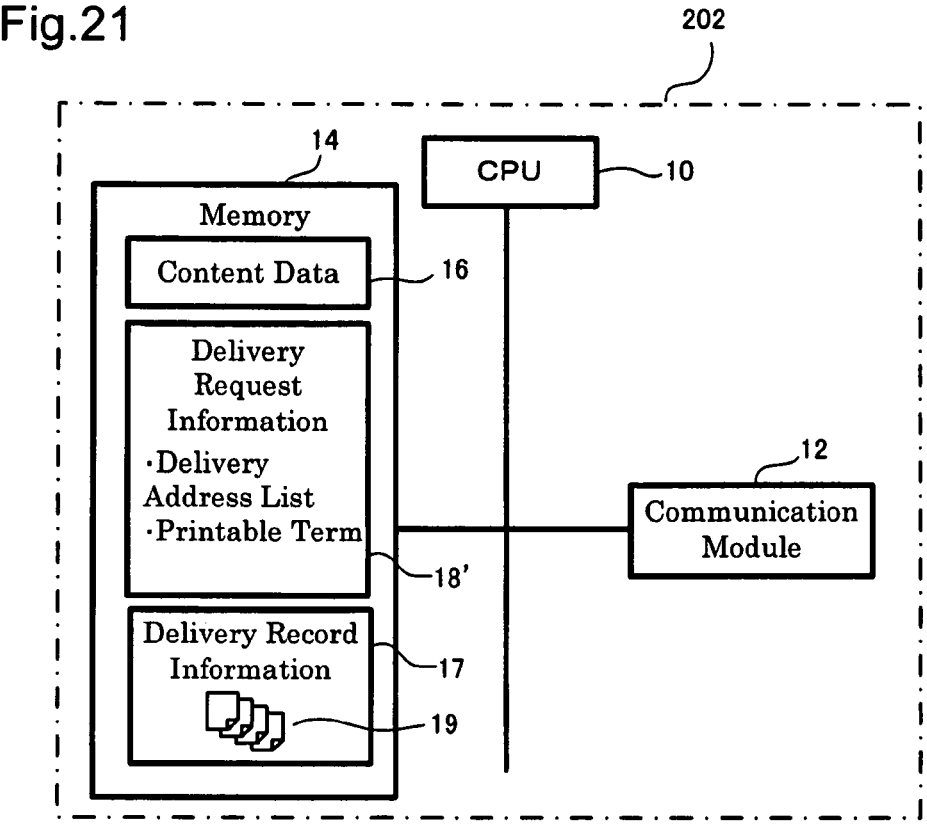
FIG. 21 is a block diagram showing the primary structure of a posting server included in the content transmission system of FIG. 20.

FIG. 21 is a block diagram showing the primary structure of a posting server 202 included in the content transmission system of FIG. 20. As described below, the posting server 202 receives specification of a printable term of a print content, in addition to a delivery request of the print content from the sending terminal 212S of the company (sender). As shown in FIG. 21, delivery request information 18' stored in the memory 14 of the posting server 202 includes information on the printable term, in addition to a delivery address list. The posting server 202 also has an input unit, such as a keyboard and a pointing device, and a display unit, such as a monitor, in addition to the above primary components, although these additional components are omitted from the illustration.

Figure 22:
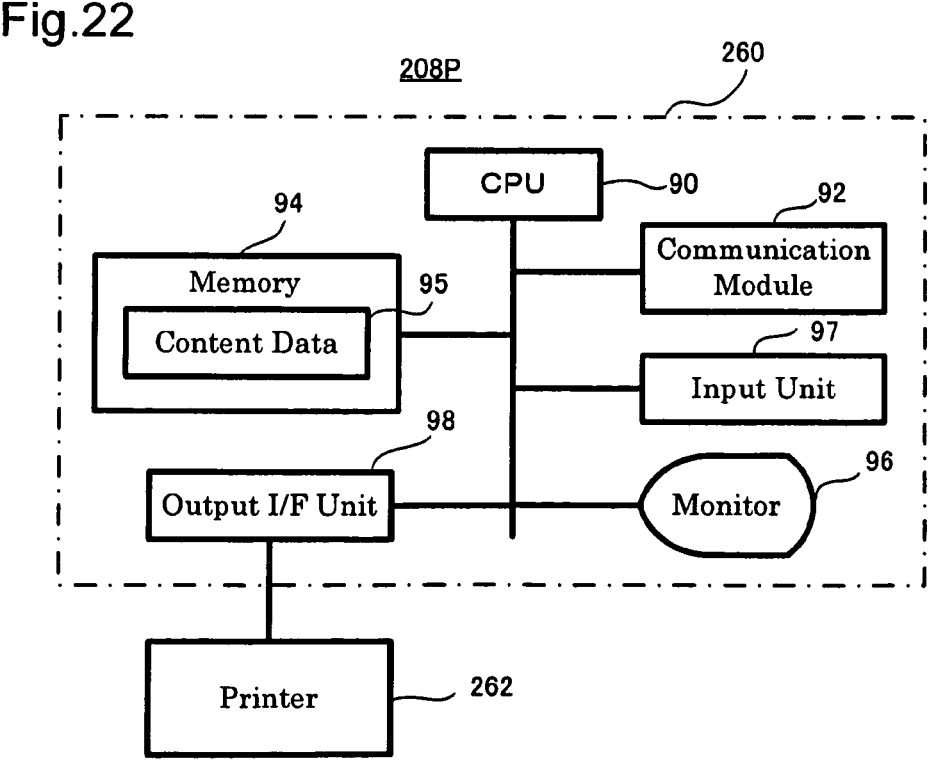
FIG. 22 is a block diagram showing the primary structure of a printing terminal included in the content transmission system of FIG. 20.

FIG. 22 is a block diagram showing the primary structure of a printing terminal 208P included in the content transmission system of FIG. 20. The printing terminal 208P is constructed by a personal computer 260 and a printer 262 connected to the personal computer 260 by a USB cable or another equivalent means as mentioned previously. The personal computer 260 mainly includes a CPU 90 configured to perform diversity of processing operations and controls according to programs, a communication module 92 configured to transmit various data and information to and from other devices via a network, a memory 94 configured to store programs as well as data and information therein, a monitor 96 configured to display obtained data and information, an input unit 97 configured to include, for example, a keyboard and a pointing device and operated to enter the user's instructions, and an output interface (I/F) unit 98 configured to output data to the externally printed printer 262.

G-2. System Operation

Figure 23:
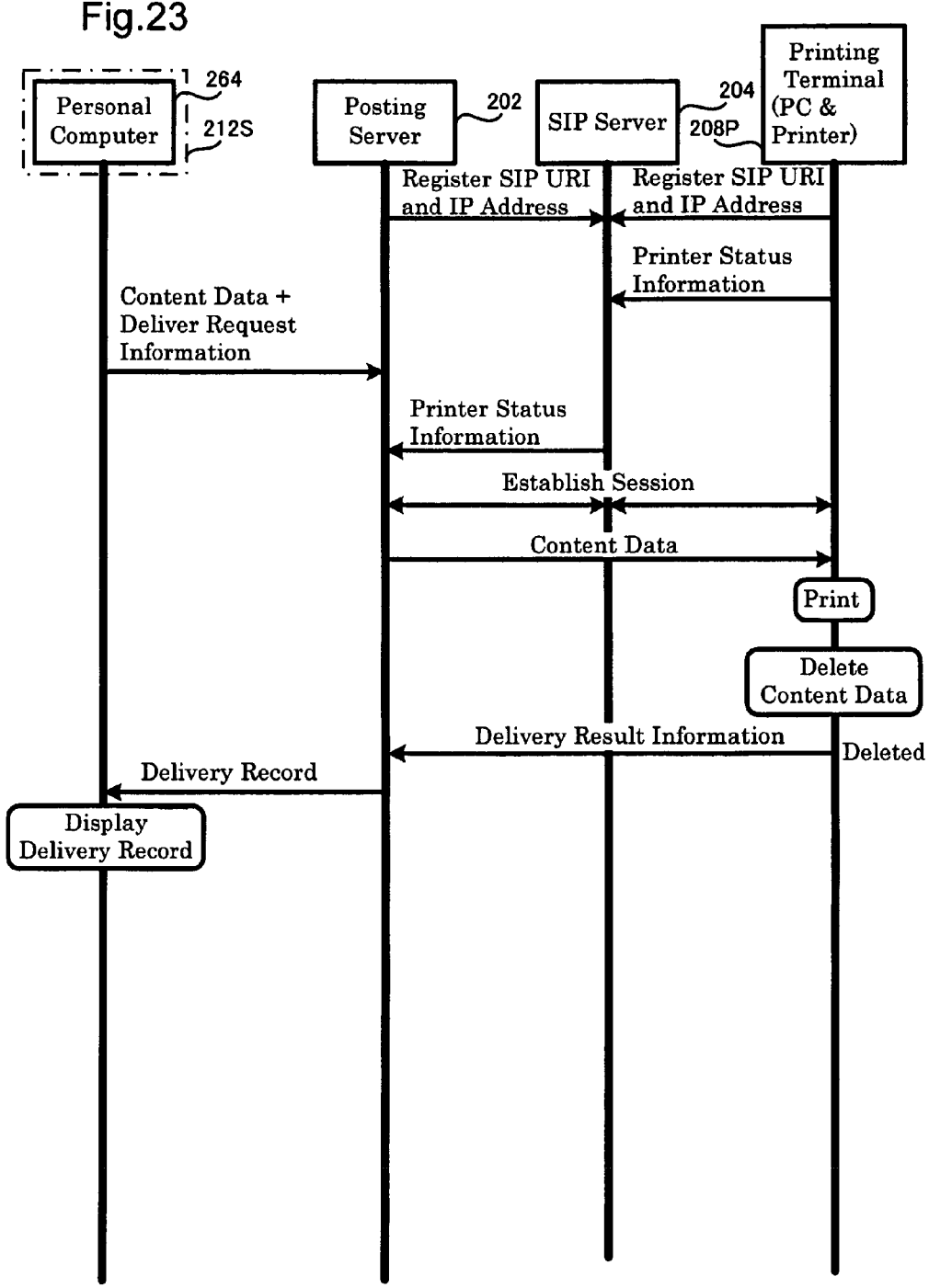
FIG. 23 schematically shows transmission of data and information between a sending terminal, the posting server, an SIP server, and the printing terminal in the content transmission system of FIG. 20.

FIG. 23 schematically shows transmission of data and information between the sending terminal 212S, the posting server 202, the SIP server 204, and the printing terminal 208P in the content transmission system of FIG. 20. The time flows from the top to the bottom of FIG. 23. In FIG. 23, PC represents the personal computer 260 of the printing terminal 208P.

As shown in FIG. 23, the posting server 202 and the printing terminal 208P are respectively activated to make access to the SIP server 204 belonging to the same domain (west.com), output a registration request to the accessed SIP server 204, and send information including its own SIP URI and IP address to the accessed SIP server 204. In this state, the SIP server 204 accepts the registration requests and registers the received information as registration information.

On completion of the SIP-related advance preparation, the SIP server 204 functions as the presence server. The SIP server 204 obtains information on the status of the printing terminal 208P belonging to the same domain (west.com) as the printer status information and stores and manages the obtained printer status information in the memory.

The company (sender) provides content data as an object print content to be delivered and a delivery address list and specifies a desired printable term (time, date, month, year). The personal computer 264 of the sending terminal 212S sends the content data and delivery request information including the delivery address list and the specified printable term to the posting server 202. The CPU 10 of the posting server 202 stores the received content data 16 and the received delivery request information 18' including the delivery address list and the printable term into the memory 14 as shown in FIG. 21.

Figure 24:
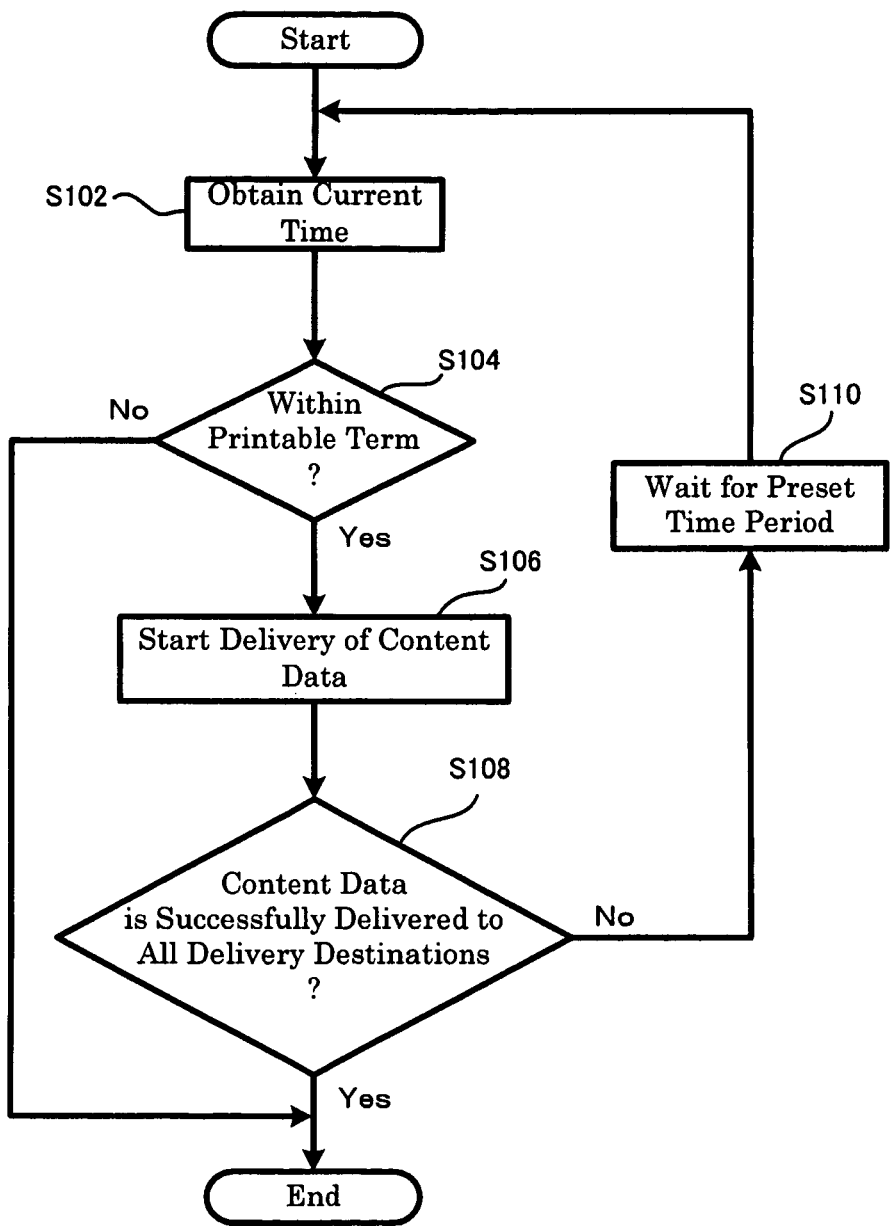
FIG. 24 is a flowchart showing a content delivery start validation process executed by the posting server of FIG. 23.

When the delivery request information 18' includes the printable term, the CPU 10 of the posting server 202 executes a content delivery start validation process shown in FIG. 24, prior to delivery of content data.

FIG. 24 is a flowchart showing the content delivery start validation process executed by the posting server 202 of FIG. 23. On the start of the content delivery start validation process, the CPU 10 of the posting server 202 obtains the current time from an internal clock (step S102) and reads out the delivery request information 18' from the memory 14 to obtain the printable term included in the delivery request information 18'. The CPU 10 compares the current time with the printable term and determines whether the current time is within the printable term (step S104). Upon determination that the current time is within the printable term (not out of the printable term), the CPU 10 analyzes the delivery address list included in the delivery request information 18' and starts delivery of content data based on the analyzed delivery address list according to the procedure explained later (step S106). The CPU 10 subsequently determines whether the content data is successfully delivered without any error to all the delivery destinations included in the delivery address list (step S108). If there is any delivery destination failing to receive the delivered content data, the CPU 10 redelivers the content data after elapse of a preset time period. Namely the CPU 10 waits for the preset time period (step S110) and goes back to step S102 to repeat the above series of processing. As long as the current time is within the printable term, redelivery of content data (error retry) is repeated for any delivery destination failing to receive the delivered content data. The delivery of content data is failed, for example, when there is some error in the course of sending the content data from the posting server to the printing terminal or when the printing terminal is in the unprintable state.

Upon successful delivery of the content data to all the delivery destinations (step S108: yes), the CPU 10 terminates the processing flow of FIG. 24. Upon determination that the current time is out of the printable term (step S104: no), the CPU 10 also terminates the processing flow of FIG. 24.

The redelivery of the content data may be performed with the following modifications:

(1) The repetition interval of the redelivery is shortened as the current time approaches the time limit of the printable term. For example, on the date of three days before the time limit of the printable term, the redelivery timing of once a day is changed to three times a day. This is implemented by shortening the wait time of step S110.

(2) In the case of redelivery of multiple content data, redelivery starts in the sequence of content data having the less remaining time to the time limit of the printable term.

Figure 25:
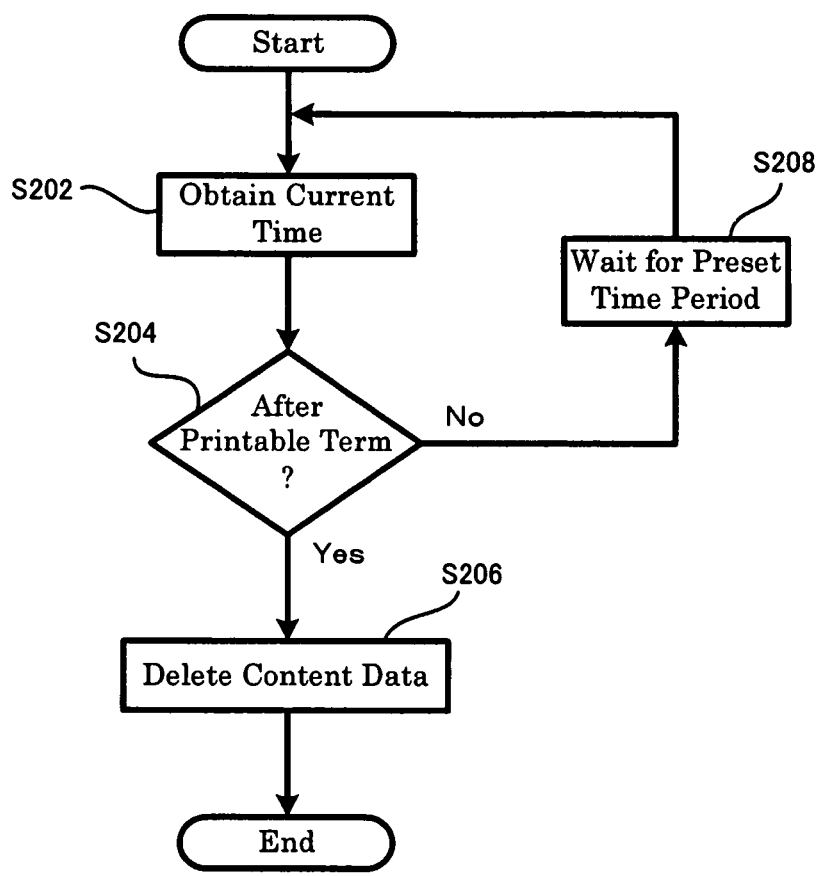
FIG. 25 is a flowchart showing a content deletion validation process executed by the posting server of FIG. 23.

The CPU 10 of the posting server 202 executes a content deletion validation process shown in FIG. 25, in parallel to the content delivery start validation process of FIG. 24.

FIG. 25 is a flowchart showing the content deletion validation process executed by the posting server 202 of FIG. 23. On the start of the content deletion validation process, the CPU 10 of the posting server 202 obtains the current time (step S202) and the printable term included in the delivery request information 18'. The CPU 10 compares the current time with the printable term and determines whether the current time is out of the printable term (step S204). Upon determination that the current time is not out of the printable term (step S204: no), the CPU 10 waits for a preset time period (step S208) and goes back to step S202 to repeat the above series of processing. Upon determination that the current time is out of the printable term (step S204: yes), on the other hand, the CPU 10 deletes the content data 16 from the memory 14 (step S206) and terminates the processing flow of FIG. 25. The posting server 202 checks the printable term of each print content at regular intervals and deletes the print content expiring its printable term.

The series of processing after the start of delivery of content data is explained with reference to FIG. 23. As mentioned previously, the content transmission system of this embodiment adopts the technique of the 'push'-type printing (direct printing) to implement a series of processing from delivery, printing, to deletion of content data as one communication session.

The CPU 10 of the posting server 202 refers to the delivery address list and sends a request to the SIP server 204 to provide the printer status information on the printing terminal 208P as the delivery destination. The CPU 30 of the SIP server 204 accepts the request, reads out the printer status information on the printing terminal 208P from the memory, and provides the posting server 202 with the printer status information. The CPU 10 of the posting server 202 receives the provided printer status information, analyzes the printer status information, and determines whether the printing terminal 208P as the delivery destination is in the printable state. Upon determination that the printing terminal 208P is in the printable state, the posting server 202 transmits requests and responses to and from the personal computer 260 of the printing terminal 208P via the SIP server 204 to establish a session for delivery of content data. Upon determination that the printing terminal 208P is in the unprintable state, on the other hand, the posting server 202 does not start delivery of content data to the printing terminal 208P but stands by.

On establishment of the session between the posting server 202 and the printing terminal 208P, the posting server 202 makes direct access to the personal computer 260 of the printing terminal 208P based on the IP address of the printing terminal 208P to deliver the content data in the 'push' type according to the HTTP protocol. Attribute information is attached to the content data and includes an instruction for the 'push'-type printing.

In the personal computer 260 of the printing terminal 208P, the CPU 90 receives the content data via the communication module 92 and temporarily stores the content data 95 into the memory 94. The CPU 90 analyzes the attribute information attached to the content data 95, receives the instruction for the 'push'-type printing, and sends the content data 95 with a print command to the printer 262. The printer 262 performs a printing operation according to the received content data and outputs a resulting print content. The personal computer 260 makes the received content data subjected to a required series of processing and converts the content data into a data format printable by the printer 262. On completion of the printing operation, the printer 262 notifies the personal computer 260 of completion of printing the content data. The CPU 90 of the personal computer 260 receives the notification, deletes the content data 95 stored in the memory 94, creates delivery result information, and sends the created delivery result information via the communication module 92 to the posting server 202 according to the HTTP protocol (solid arrow 266 in FIG. 20).

The CPU 10 of the posting server 202 receives the delivery result information and stores the received delivery result information 19 as the updated delivery record information 17 into the memory 14. The CPU 10 of the posting server 202 then notifies the personal computer 264 of the sending terminal 212S of the updated delivery record information 17. The personal computer 264 displays the details of the notified delivery record information on the monitor.

G-3. Effects of Embodiment

In the content transmission system of the sixth embodiment described above, in delivery of a print content with a time limit, the posting server 202 determines whether the current time is within the printable term and allows delivery of content data to the printing terminal as the delivery destination within the printable term while deleting the content data and prohibiting delivery of the content data after the printable term. In delivery of content data, the content transmission system of the sixth embodiment adopts the technique of the 'push'-type printing (direct printing) to implement a series of processing from delivery, printing, to deletion of content data as one communication session. The content data is deleted immediately after the printing operation in the printing terminal. In the content transmission system of the sixth embodiment, the content data does not remain in the posting server 202 or in the customer's (receiver's) printing terminal after a time limit expected by the company (sender). This arrangement effectively prevents illegal utilization of the content data and restricts the use of the print content after its preset printable term.

H. Seventh Embodiment

The content transmission system of the sixth embodiment adopts the 'push'-type printing (direct printing) technique. The content data delivered to the printing terminal 208P is deleted immediately after completion of the printing operation in the printing terminal 208P managed by the customer (receiver). The content data is thus not kept in the printing terminal 208P. In a printing terminal having a 'Print After' function, however, content data delivered to the printing terminal is kept and is printed in response to the customer's (receiver's) instruction. In this case, the content data may remain in the customer's printing terminal even after a time limit expected by the company.

In a content transmission system of a seventh embodiment, in delivery of a print content with a time limit, a posting server is utilized to manage content data kept in the customer's (receiver's) printing terminal in a time limitation manner and thereby prevent the content data from remaining in the customer's printing terminal after a time limit expected by the sender. This arrangement effectively restricts the use of a print content after its printable term.

H-1. System Configuration

Figure 26:
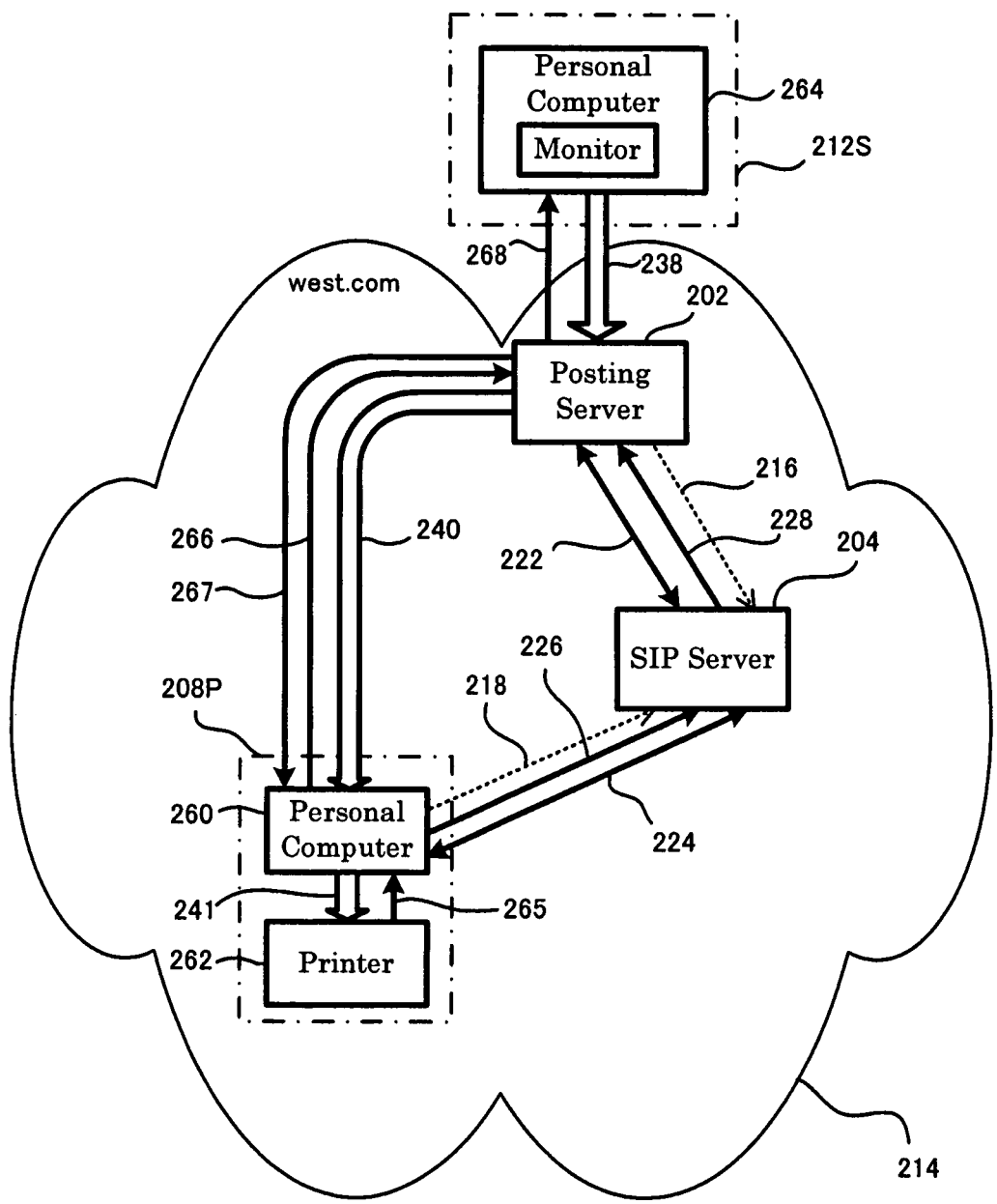
FIG. 26 is a block diagram schematically illustrating the configuration of a content transmission system in a seventh embodiment of the invention.

FIG. 26 is a block diagram schematically illustrating the configuration of the content transmission system in the seventh embodiment of the invention.

The configuration of the content transmission system of the seventh embodiment shown in FIG. 26 is basically similar to that of the content transmission system of the fifth embodiment shown in FIG. 18, except an additional signal line (solid arrow 266) to send content data information from the printing terminal 208P to the posting server 202 and an additional signal line (solid arrow 267) to send back a response of 'print permitted' or 'print forbidden' from the posting server 202 to the printing terminal 208P. Otherwise the content transmission system of the seventh embodiment has the same configuration as that of the content transmission system of the fifth embodiment. The same constituents are expressed by the like numerals and are not specifically described here. The structures of the posting server 202 and the printing terminal 208P are identical with those of the sixth embodiment shown in FIGS. 21 and 22 and are thus not specifically described here. The content transmission system of the seventh embodiment manages the content data kept in the customer's (receiver's) printing terminal 208P in a time limitation manner. In the personal computer 260 of the printing terminal 208P, the CPU 90 performs diversity of processes described below according to a specific application program. In the content transmission system of the seventh embodiment, the printing terminal 208P may have any of the configurations shown in FIG. 5.

H-2. System Operation

The series of processing to establish a session between the posting server 202 and the printing terminal 208P and start delivery of content data from the posting server 202 to the printing terminal 208P in the content transmission system of the seventh embodiment is identical with the processing in the content transmission system of the sixth embodiment and is thus not specifically described here.

Figure 27:
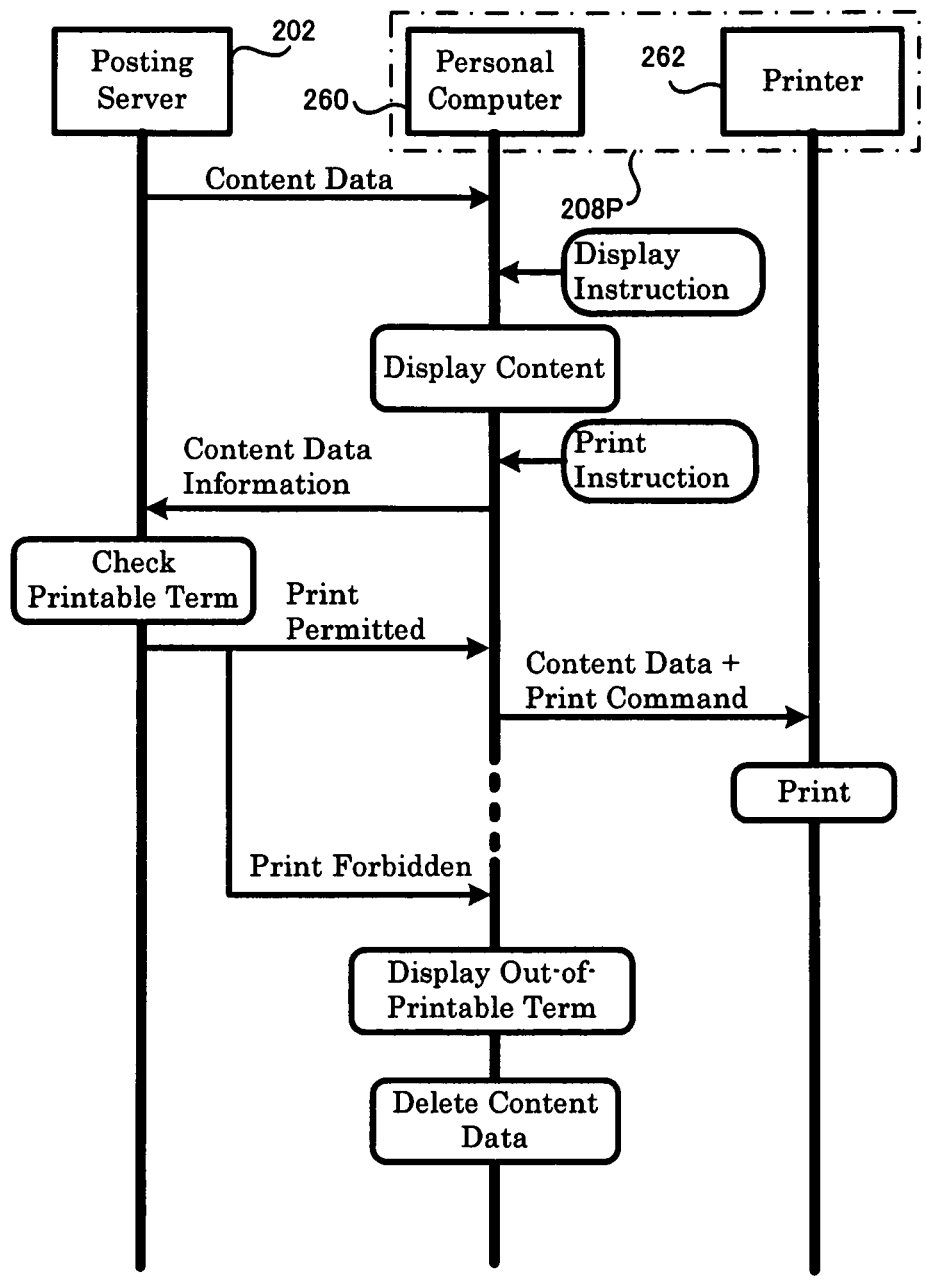
FIG. 27 schematically shows transmission of data and information between a posting server and a printing terminal in the content transmission system of FIG. 26 after delivery of content data.

FIG. 27 schematically shows transmission of data and information between the posting server 202 and the printing terminal 208P in the content transmission system of FIG. 26 after delivery of content data. The time flows from the top to the bottom of FIG. 27.

The printing terminal 208P has the 'Print After' function and performs a printing operation in response to the customer's (receiver's) instruction after the customer checks the detail of delivered content data on the monitor.

On establishment a session between the posting server 202 and the printing terminal 208P, the posting server 202 makes direct access to the personal computer 260 of the printing terminal 208P based on the IP address of the printing terminal 208P to deliver content data in the 'push' type according to the HTTP protocol.

In the personal computer 260 of the printing terminal 208P, the CPU 90 receives the content data via the communication module 92 and temporarily stores the content data 95 into the memory 94. In response to the customer's (receiver's) display instruction via the input unit 97 to enable the customer to check the detail of the content data, the CPU 90 displays the detail of a print content according to the content data 95 on the screen of the monitor 96. In response to the customer's (receiver's) subsequent print instruction for the checked print content via the input unit 97, the CPU 90 makes access to the posting server 202 via the communication module 92 and sends content data information regarding the content data to be printed (for example, information on the sender, information on the delivery destination, and file name of the content data) (solid arrow 266). In the case of failed access to the posting server 202, the CPU 90 prohibits the customer (receiver) to perform a printing operation (for example, by disabling a user interface, such as a print button).

The posting server 202 obtains a printable term from delivery request information 18' for content data identified by the received content data information, compares the printable term with the current time obtained from an internal clock, and determines whether the current time is within the printable term. Upon determination that the current time is within the printable term (not out of the printable term), the CPU 90 sends back a response of 'Print Permitted' via the communication module 92 to the printing terminal 208P (solid arrow 267). Upon determination that the current time is out of the printable term, on the other hand, the CPU 90 sends back a response of 'Print Forbidden' to the printing terminal 208P (solid arrow 267). In the posting server 202, the CPU 90 also sends back the response of 'Print Forbidden' when the content data in the posting server 202 has already been deleted in response to the determination of 'out-of-printable term' (step S204: yes) in the content deletion validation process shown in FIG. 25.

In the personal computer 260 of the printing terminal 208P, the CPU 90 receives the response via the communication module 92 and analyzes the received response. When the received response represents 'Print Permitted', the personal computer 260 instructs the printer 262 to start a printing operation based on the content data 95. According to a concrete procedure, the CPU 90 sends a print command with the content data 95 to the printer 262. The printer 262 performs a printing operation according to the received content data and outputs a resulting print content. The personal computer 260 makes the received content data subjected to a required series of processing and converts the content data into a data format printable by the printer 262.

When the received response represents 'Print Forbidden', on the other hand, the CPU 90 displays a message showing the out-of-printable term on the monitor 96 and deletes the content data 95 stored in the memory 94.

In the above description, the personal computer 260 of the printing terminal 208P sends a request to the posting server 202 to check the printable term, in response to reception of the customer's (receiver's) print instruction. In one modification, the personal computer 260 may request the posting server 202 to make the check for the printable term at regular intervals. According to a concrete procedure, the CPU 90 of the personal computer 260 refers to the count on a timer and makes access to the posting server 202 at regular intervals to request the check for the printable term.

In the system of requesting the check for the printable term at regular intervals, the personal computer 260 may additionally receive information regarding a remaining time to the time limit of the printable term as the response from the posting server 202. When the printable term of unprinted content data is going to expire, the CPU 90 may display a message of urging the customer to immediately print a corresponding print content on the screen of the monitor 96. The CPU 90 may further send a print instruction to the printer 262 to automatically start printing the unprinted content data. For example, on the date of three days before the time limit of the printable term, the message of urging the customer to immediately print the content data is displayed on the monitor. On the date of the time limit of the printable term, printing the content data is automatically started.

In the system of requesting the check for the printable term at regular intervals, when the current time is out of the printable term (that is, in the case of 'Print Forbidden'), the CPU 90 of the personal computer 260 displays the message showing the out-of-printable term' and deletes the content data.

Instead of the display of the message showing the out-of-printable term on the screen of the monitor 96, the customer (receiver) may be notified of the out-of-printable term by a voice message, an alarm lamp, or any other suitable means.

H-3. Effects of Embodiment

In the content transmission system of the seventh embodiment described above, in delivery of a print content with a time limit, the printing terminal 208P requests the posting server 202 to check whether the current time is out of a preset printable term of corresponding content data. The printing terminals 208P starts a printing operation based on the content data in response to a response representing the 'within printable term' from the posting server 202, while deleting the content data and prohibiting the printing operation of the content data in response to a response representing the 'out-of-printable term' from the posting server 202. Even in the printing terminal 208P having the 'Print After' function to keep the content data delivered to the printing terminal 208P and perform the printing operation of the content data in response to the customer's (receiver's) instruction, this arrangement prevents the content data from remaining in the customer's (receiver's) printing terminal 208P after a preset time limit expected by the company (sender). This arrangement thus desirably prohibits illegal printing of content data and restricts the use of a print content after its printable term.

I. Modifications 2

The embodiments and modified examples discussed above are to be considered in all aspects as illustrative and not restrictive. There may be many other modifications, changes, and alterations without departing from the scope or spirit of the main characteristics of the present invention.

In the content transmission systems of the above embodiments, the network is a broadband network, such as the Internet. The network may otherwise be, for example, a mobile telephone network or a public telephone network.

The content transmission systems of the above embodiments adopt SIP as the signaling protocol. This is, however, not restrictive, but any of H.323, MGCP (Media Gateway Control Protocol), and MEGACO (Media Gateway Control) may be used instead of SIP. The content transmission systems of the above embodiments adopt HTTP as the data transfer protocol. This is, however, not restrictive, but any of FTP, RTP (Realtime Transport Protocol), IRC (Internet Relay Chat), and TELNET may be used instead of HTTP. Diversity of similar techniques having the global address management function and the presence service function, for example, Skype (registered trademark) and Instant Messaging, may alternatively be used for the session establishment and for the data transfer.

In the content transmission systems of the above embodiments, the SIP server is used as the proxy server to mediate establishment of a session. The SIP protocol enables establishment of a session in peer-to-peer fashion as long as SIP clients are notified of the SIP URIs and IP addresses of the others. In this case, the SIP clients may directly establish a session without mediation of the SIP server.

In the content transmission systems of the above embodiments, content data is delivered in the 'push' type from the posting server to the printing terminal. This is, however, not restrictive, but the content data may be delivered in a 'pull' type. In the 'pull'-type delivery, a terminal sends a request for data delivery to a server, and the server delivers data to the terminal in response to the request.

In the content transmission systems of the above embodiments, the IP addresses are used as location information on the network. MAC (Media Access Control) addresses may alternatively be used as location information on the network.

In the content transmission systems of the above embodiments including multiple SIP servers on the network, the respective SIP servers individually manage the registration information and the presence information (for example, information on the status of each SIP client). In one modification, the multiple SIP servers may share the registration information and the presence information. In another modification, the multiple SIP servers may be synchronized with each other to reflect update of information stored in one server on information stored in another SIP server.

The SIP server may be designed to have a filtering function to transmit only required pieces of information to another domain.

In the content transmission systems of the above embodiments, the delivery address list is used as the delivery destination information for delivery of content data. The delivery destination information is, however, not restricted to such a list form but may be any other suitable form to specify delivery destinations.

Finally the present application claims the priority based on Japanese Patent Applications No. 2007-198773 filed on Jul. 31, 2007 and No. 2007-241424 filed on Sep. 18, 2007, which are herein incorporated by reference.

What is claimed is:

1. A posting server connected to a network, the posting server having stored thereon a program to cause the posting server to perform the functions of:
  a receiver module configured to receive content data for printing a content from a sending terminal;
  a delivery module configured to deliver the content data to a printing terminal via the network;
  a storage unit configured to store delivery record information regarding the delivered content data; and
  a notification module,
  wherein in response to transmission of first delivery result information created by the printing terminal regarding the delivered content data from the printing terminal, the receiver module receives the transmitted first delivery result information and creates and stores in the storage unit delivery record information based on the first delivery result information received from the printing terminal, wherein
  the receiver module creates second delivery result information regarding the delivered content data separately from the first delivery result information received from the printing terminal, and creates and stores in the storage unit delivery record information based on the created second delivery result information,
  the notification module notifies the sending terminal of at least part of the delivery record information based on the first delivery result information received from the printing terminal and the delivery record information based on the created second delivery result information, the first delivery result information created by the printing terminal represents a delivery state of the delivered content data from the printing terminal,
  the second delivery result information created by the receiver module is not obtained from the printing terminal and is based on information other than the first delivery result information received from the printing terminal, and
  the second delivery result information created by the receiver module represents a delivery state of the content data delivered from the delivery module.

2. The posting server in accordance with claim 1, wherein the first and the second delivery result information each include at least one of a status of the content data, a time when the content data is in the status, and a storage location of the content data.

3. The posting server in accordance with claim 2, wherein the notification module notifying the sending terminal of at least part of the delivery record information comprises notifying the sending terminal of at least one of the storage location of the content data and the status of the content data according to the storage location of the content data.

4. The posting server in accordance with claim 3, wherein the status of the content data according to the storage location of the content data comprises at least one of an accepted for delivery status, a waiting for redelivery status, and a delivery error status.

5. The posting server in accordance with claim 2, wherein the notification module notifying the sending terminal of at least part of the delivery record information comprises notifying the sending terminal which of the storage locations of the content data including the posting server and the printing terminal currently stores the content data, and notifying the sending terminal of the status of the content data according to the storage location of the content data.

6. The posting server in accordance with claim 2, wherein the first and the second delivery result information each include at least the storage location of the content data, the storage location of the content data included in the first delivery result information comprises the printing terminal, and the storage location of the content data included in the second delivery result information comprises the posting server.

7. The posting server in accordance with claim 1, wherein, in response to a change in status of the content data, the posting server creates third delivery result information regarding the change in status of the content data, adds the created third delivery result information to the delivery record information stored in the storage unit, and notifies the sending terminal of at least part of the delivery record information.

8. The posting server in accordance with claim 1, wherein the posting server receives delivery destination information with the content data from the sending terminal and delivers the content data based on the received delivery destination information.

9. The posting server in accordance with claim 1, wherein the receiver module obtains the first delivery result information from an information collecting server as part of information that the information collecting server receives from the printing terminal.

10. The posting server in accordance with claim 1, further comprising a communication module configured to establish a session with the printing terminal via a SIP (Session Initiation Protocol) server based on a signaling protocol, wherein, after establishment of the session, the delivery module is configured to deliver the content data to the printing terminal without mediation by the SIP server.

11. A content transmission system configured to transmit content data for printing a content via a network, the content transmission system comprising:
- a sending terminal configured to send the content data;
- a posting server connected to the network, constructed to have a storage unit, and configured to receive the content data from the sending terminal, to deliver the received content data via the network, and to store delivery record information regarding the delivered content data into the storage unit; and
- a printing terminal connected to the network and configured to receive the content data delivered by the posting server and perform a printing operation according to the received content data, wherein
- the printing terminal creates first delivery result information regarding the delivered content data and transmits the created first delivery result information to the posting server,
- the posting server receives the transmitted first delivery result information, creates and stores in the storage unit delivery record information based on the first delivery result information received from the printing terminal,
- the posting server creates second delivery result information regarding the delivered content data separately from the first delivery result information received from the printing terminal, and creates and stores in the storage unit delivery record information based on the created second delivery result information, and notifies the sending terminal of at least part of the delivery record information based on the first delivery result information received from the printing terminal and the delivery record information based on the created second delivery result information,
- the first delivery result information created by the printing terminal represents a delivery state of the delivered content data from the printing terminal,
- the second delivery result information created by the posting server is not obtained from the printing terminal and is based on information other than the first delivery result information received from the printing terminal, and
- the second delivery result information created by the posting server represents a delivery state of the delivered received content data.

12. A content delivery method of controlling a posting server connected to a network and constructed to have a storage unit, the content delivery control method comprising the steps of:
- (a) receiving content data for printing a content from a sending terminal;
- (b) delivering the received content data to a printing terminal via the network;
- (c) storing delivery record information regarding the delivered content data into the storage unit;
- (d) receiving first delivery result information regarding the delivered content data from the printing terminal, if any, the first delivery result information representing a delivery state of the delivered content data from the printing terminal;
- (e) creating and storing in the storage unit delivery record information based on the first delivery result information received from the printing terminal;
- (f) creating second delivery result information regarding the delivered content data separately from the first delivery result information received from the printing terminal, and creating and storing in the storage unit delivery record information based on the created second delivery result information, the second delivery result information representing a delivery state of the delivered received content data, and the second delivery result information not being obtained from the printing terminal and being based on information other than the first delivery result information received from the printing terminal; and
- (g) notifying the sending terminal of at least part of the delivery record information.

13. The content delivery control method in accordance with claim 12, wherein the first and second delivery result information each include at least one of a status of the content data, a time when the content data is in the status, and a storage location of the content data.

14. The content delivery control method in accordance with claim 13, wherein notifying the sending terminal of at least part of the delivery record information comprises notifying the sending terminal of at least one of the storage location of the content data and the status of the content data according to the storage location of the content data.

15. The content delivery control method in accordance with claim 14, wherein the status of the content data according to the storage location of the content data comprises at least one of an accepted for delivery status, a waiting for redelivery status, and a delivery error status.

16. The content delivery control method in accordance with claim 13, wherein notifying the sending terminal of at least part of the delivery record information comprises notifying the sending terminal which of the storage locations of the content data including the posting server and the printing terminal currently stores the content data, and notifying the sending terminal of the status of the content data according to the storage location of the content data.

17. The content delivery control method in accordance with claim 13, wherein the first and the second delivery result information each include at least the storage location of the content data, the storage location of the content data included in the first delivery result information comprises the printing terminal, and the storage location of the content data included in the second delivery result information comprises the posting server.

18. The content delivery control method in accordance with claim 12, the posting server control method further having the step of:
- (h) in response to a change in status of the content data, creating third delivery result information regarding the change in status of the content data, adding the third created delivery result information to the delivery record information stored in the storage unit, and notifying the sending terminal of at least part of the delivery record information.

19. The content delivery control method in accordance with claim 12, wherein the step (a) receives delivery destination information with the content data from the sending terminal, and
- the step (b) delivers the received content data according to the delivery destination information.

20. A system connected to a network, the system comprising:
- a first unit configured to receive content data for printing a content from a sending terminal;
- a second unit configured to deliver the received content data to a printing terminal via the network;
- a third unit configured to store delivery record information regarding the delivered content data; and a fourth unit; wherein
in response to transmission of first delivery result information created by the printing terminal regarding the delivered content data from the printing terminal, the first unit receives the transmitted first delivery result information and creates and stores in the third unit delivery record information based on the first delivery result information received from the printing terminal,
the first unit creates second delivery result information regarding the delivered content data separately from the first delivery result information received from the printing terminal, and creates and stores in the third unit delivery record information based on the created second delivery result information,
the fourth unit notifies the sending terminal of at least part of the delivery record information based on the first delivery result information received from the printing terminal and the delivery record information based on the created second delivery result information,
the first delivery result information created by the printing terminal represents a delivery state of the delivered content data from the printing terminal,
the second delivery result information created by the first unit is not obtained from the printing terminal and is based on information other that the first delivery result information received from the printing terminal, and
the second delivery result information created by the first unit represents a delivery state of the content data delivered from the second unit.

* * * * *